US012715714B2

(12) United States Patent
Tondreau, III et al.

(10) Patent No.: US 12,715,714 B2
(45) Date of Patent: Aug. 25, 2026

(54) ROBOT INFORMED DYNAMIC PARCEL INFLOW GATING

(71) Applicant: Dexterity, Inc., Redwood City, CA (US)

(72) Inventors: David Leo Tondreau, III, San Francisco, CA (US); Jordan Cedarleaf-Pavy, Mountain View, CA (US); Austen Poteet, San Francisco, CA (US); Harshit Shah, Menlo Park, CA (US); Timothy Ryan, San Francisco, CA (US); Talbot Morris-Downing, Redwood City, CA (US); Toby Leonard Baker, Redwood City, CA (US); Shitij Kumar, Redwood City, CA (US); Rob Markota, San Francisco, CA (US)

(73) Assignee: Dexterity, Inc., Redwood City, CA (US)

( * ) Notice: Subject to any disclaimer, the term of this patent is extended or adjusted under 35 U.S.C. 154(b) by 831 days.

(21) Appl. No.: 18/100,751

(22) Filed: Jan. 24, 2023

(65) Prior Publication Data

US 2023/0242353 A1 Aug. 3, 2023

Related U.S. Application Data

(60) Provisional application No. 63/304,805, filed on Jan. 31, 2022.

(51) Int. Cl.
*G06F 7/00* (2006.01)
*B65G 47/14* (2006.01)
(Continued)

(52) U.S. Cl.
CPC ....... *B65G 47/905* (2013.01); *B65G 47/1492* (2013.01); *B65G 47/18* (2013.01);
(Continued)

(58) Field of Classification Search
CPC .. B65G 47/905; B65G 47/1492; B65G 47/18; B65G 47/8892; B65G 2203/0225;
(Continued)

(56) References Cited

U.S. PATENT DOCUMENTS 3,247,929 A 4/1966 Langley
4,576,286 A 3/1986 Buckley
(Continued)

FOREIGN PATENT DOCUMENTS

CN 109230470 1/2019
CN 209401123 9/2019
(Continued)

*Primary Examiner* — Yolanda R Cumbess
(74) *Attorney, Agent, or Firm* — Van Pelt, Yi & James LLP

(57) ABSTRACT

The present application discloses a method, system, and computer system for controlling a gating structure to mediate a flow of items an input source to a pick area. The system includes: (i) the gating structure, which is configured to use a plurality of gate elements to mediate a flow of items from the input source to the pick area, (ii) a sensor configured to provide a sensor output associated with the pick area, and (iii) a processor configured to provide a control input to the gating structure to adjust a configuration of one or more of the plurality of gating elements based at least in part on the sensor output. The sensor output comprises the sensor output comprises one or more of a flow rate, a number, and an orientation of objects in an area associated with picking of objects by one or more robots. The control input is determined based at least in part on one or more of the flow rate, the number, and the orientation of objects in the area associated with picking of objects by one or more robots.

31 Claims, 28 Drawing Sheets

(51) Int. Cl.

| | |
|---|---|
| ***B65G 47/18*** | (2006.01) |
| ***B65G 47/88*** | (2006.01) |
| ***B65G 47/90*** | (2006.01) |
| ***G01N 23/046*** | (2018.01) |
| ***G01N 23/083*** | (2018.01) |
| ***G01T 1/24*** | (2006.01) |

(52) U.S. Cl.
CPC ....... *B65G 47/8892* (2013.01); *G01N 23/046* (2013.01); *G01N 23/083* (2013.01); *G01T 1/247* (2013.01); *B65G 2203/0225* (2013.01); *B65G 2203/0241* (2013.01); *B65G 2203/025* (2013.01); *B65G 2203/041* (2013.01); *B65G 2203/042* (2013.01); *G01N 2223/04* (2013.01); *G01N 2223/401* (2013.01); *G01N 2223/419* (2013.01); *G01N 2223/50* (2013.01)

(58) Field of Classification Search
CPC ...... B65G 2203/0241; B65G 2203/025; B65G 2203/041; B65G 2203/042; B65G 2203/0233; B65G 2203/0258; B65G 47/68; B65G 11/203; B65G 47/00; B65G 47/02–08; B65G 47/12–14; B65G 47/16–19; B65G 47/20; B65G 47/22; B65G 47/24–244; B65G 47/26; B65G 47/261; B65G 47/28; B65G 47/29; B65G 47/295; B65G 47/30; B65G 47/31; B65G 47/34; B65G 47/44; B65G 47/46; B65G 47/52; B65G 47/53; B65G 47/56; B65G 47/57; B65G 47/58; B65G 47/69; B65G 47/71; B65G 47/74; B65G 47/82; B65G 47/88–8815; B65G 47/8823; B65G 47/883–8853; B65G 47/8876; B65G 47/8884; B65G 47/90; B65G 47/907; B65G 47/908; B65G 47/91; B65G 47/92; B65G 11/00; B65G 11/02–026; B65G 11/20; B65G 11/166; B65G 1/00; B65G 1/137; B65G 1/1373; B65G 63/02; B65G 2203/00; B65G 2203/02; B65G 2203/0208; B65G 2203/04; B65G 2205/00; B65G 2205/02; B65G 2812/00; B65G 2814/027; B65G 2814/0323; G01N 23/046; G01N 23/083; G01N 2223/04; G01N 2223/401; G01N 2223/419; G01N 2223/50; G01T 1/247; G07F 11/58; G06K 2017/0048; G06K 2017/0051; G06Q 10/08; G06Q 10/083; G06Q 10/087; B07C 1/10; B07C 1/20; B07C 5/00
USPC ................. 700/213–214, 223–224, 228–230
See application file for complete search history.

(56) References Cited

U.S. PATENT DOCUMENTS

| | | | | |
|---|---|---|---|---|
| 5,582,283 | A * | 12/1996 | Arnarson ............. | B65G 47/295 198/463.6 |
| 5,740,901 | A | 4/1998 | Lazzarotti | |
| 6,005,211 | A | 12/1999 | Huang | |
| 6,471,044 | B1 | 10/2002 | Isaacs | |
| 2004/0195318 | A1 | 10/2004 | Silverbrook | |
| 2006/0182545 | A1 | 8/2006 | Ray | |
| 2016/0001983 | A1 * | 1/2016 | Ooba ...................... | B65G 37/00 414/787 |
| 2018/0243800 | A1 | 8/2018 | Kumar | |
| 2020/0269429 | A1 | 8/2020 | Chavez | |
| 2021/0047132 | A1 * | 2/2021 | Sines ........................ | G06N 3/09 |
| 2021/0171291 | A1 * | 6/2021 | Green ..................... | B65G 47/64 |
| 2021/0253376 | A1 | 8/2021 | Aniruddha | |
| 2021/0374367 | A1 | 12/2021 | Wagner | |

FOREIGN PATENT DOCUMENTS

| | | | |
|---|---|---|---|
| CN | 110942552 | 3/2020 | |
| CN | 112978324 | 6/2021 | |
| CN | 113627843 | 11/2021 | |
| TW | 202006628 | 2/2020 | |
| TW | 202039314 | 11/2020 | |
| WO | WO-2021198053 A1 * | 10/2021 | ........... B65G 47/918 |

* cited by examiner

1000

1100

1200

1300

1400

1500

1800

ROBOT INFORMED DYNAMIC PARCEL INFLOW GATING

CROSS REFERENCE TO OTHER APPLICATIONS

This application claims priority to U.S. Provisional Patent Application No. 63/304,805 entitled ROBOT INFORMED DYNAMIC PARCEL INFLOW GATING filed Jan. 31, 2022 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

Shipping and distribution centers, warehouses, shipping docks, air freight terminals, big box stores, and other activities that ship and receive items. In some cases, the shipping of items includes receiving a non-homogenous set of items and sorting the items for shipping such as a sortation according to a destination. In other cases, the shipping of non-homogeneous sets of items use strategies such as packing and unpacking dissimilar items in boxes, crates, containers, conveyor belts, and on pallets, etc. Packing or sorting dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.). In further other cases, the shipping of items includes assembling inventory from a warehouse into a kit for shipping according to manifests or orders.

Use of robotics in connection with shipping and receiving is made more challenging in many environments due to the variety of items, variations the order, number, and mix of items to be packed, on a given pallet or kit for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
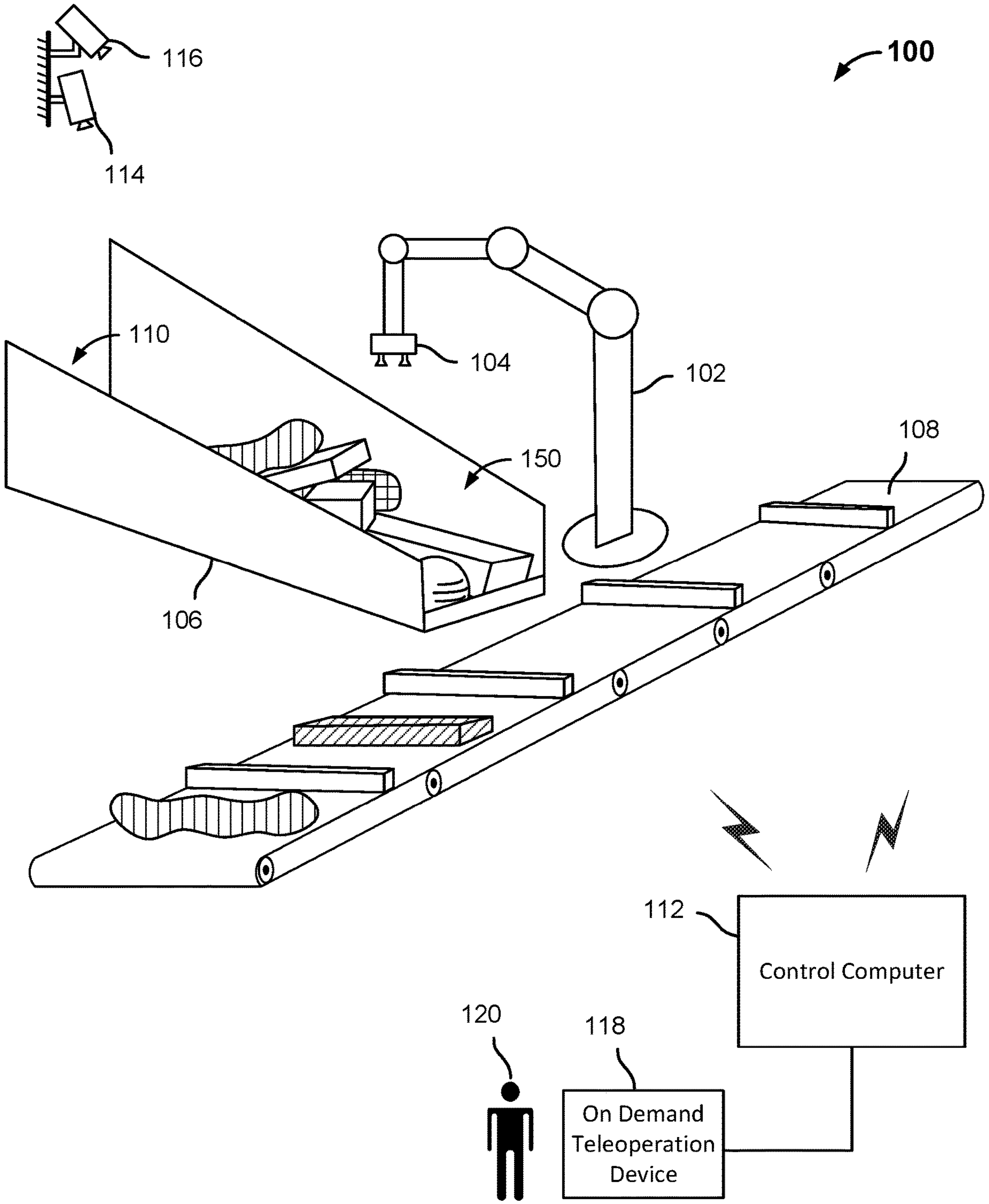
FIG. 1 is a diagram illustrating a robotic singulation system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, kitting may include the picking of one or more items/objects from corresponding locations and placing the one or more items in a predetermined location in a manner that a set of the one or more items correspond to a kit.

As used herein, singulation may include the picking of one or more items/objects from a source pile or flow, and singly placing the one or more items in corresponding predetermined locations such as locations on a segmented conveyor (e.g., within trays on a conveyor) or similar conveyance to be sorted and routed for transport to a downstream (e.g., ultimate addressed/physical) destination.

As used herein, palletization of an item or a set of items may include picking an item from a source location, such as a conveyance structure, and placing the item on a pallet such as on a stack of items on the pallet.

As used herein, depalletization may include picking an item from a pallet, such as from a stack of items on the pallet, moving the item, and placing the item at a destination location such as a conveyance structure.

As used herein, a gating element may include a bollard, a shaft, a paddle, a bladder, a ramp, a panel, etc. As an example, a gating element is configurable to mediate flow through a gate. The gating element may be controlled by a control signal (e.g., by a gating structure that receives a control signal). In some embodiments, the gating element may be configured to block flow of items through a gate, impede the flow of items, or unimpeded the flow of items. For example, the gating element may be configured in an open state, a closed state, or a state between the open state and the closed state. In some embodiments, a gating structure comprises gating elements that are all the same, or at least two subset of gating elements that are different from each other.

In various contexts, such as distribution centers, shipping centers, and the like, for example, sortation and/or induction systems and processes are used to receive and process an incoming flow of items, such as parcels and other packages, and send each item or group of items to a downstream or ultimate destination.

For example, packages may arrive at a distribution center, e.g., via aircraft, truck, rail, or other conveyances, as an unsorted bulk set of items. Items may be placed on the input end of a chute or other conveyance and gravity and/or (robotically controlled) conveyors may be used to provide a flow of items to a picking location from which human and/or robotic workers pick items and place each on segmented conveyor, for example, from which further individual processing may be performed, such as scanning a label and routing an item to a corresponding location. The items may be input to a singulation system comprising a robot that picks items from a pick area in the workspace of the robot and place the item on a conveyor or receptacle.

The flow of items within a chute (e.g., from an input source to a pick area from which the items are picked) is unpredictable based at least in part on (i) item geometry, (ii) chute geometry, (iii) friction coefficients, (iv) material compliance, (v) mass of items, and (vi) interaction between items on the chute and/or items in the pick area (e.g., the workspace of a robotic arm in a singulation system). In some cases, the unpredictability of the flow at the chute may cause excessive flow of items, insufficient flow of items, a jamming of items in the chute, an inconsistent burden depth (e.g., an average depth of items flowing through the chute and/or on the conveyor). The unpredictability of the flow of items can thus cause related art systems difficulty with respect to controlling/managing the density, distribution, or other characteristics of a set of items in the pick area. Accordingly, related art systems generally operate under suboptimal conditions for performing pick operations at the pick area. The suboptimal conditions make picking items from the destination difficult, resulting in a decrease in a percentage of successful pick operations or a speed in which the pick operations are performed (e.g., a robotic arm may spend more time adjusting items for successful picks, etc.).

Items may be provided to a workspace via a chute. Because the flow of items at the chute may be unpredictable, the characteristics of the set of items at the workspace (e.g., the pick area) may be unpredictable. For example, a number of items at the workspace may be unpredictable. As another example, a density of items at the workspace may be unpredictable. The efficiency with which a robotic arm moves items from/to the workspace may be sub-optimal based on a state of the workspace, such as whether the workspace is replenished with items at a sufficient rate (e.g., a rate that is the same or substantially the same as the rate at which the robotic arm moves items from the workspace), or whether the robotic arm spends time to adjust items in the workspace to facilitate successful pick operations (e.g., change an orientation of an item, move another item blocking or obstructing the item to be picked, etc.).

In various embodiments, techniques disclosed herein are used to overcome, prevent, and/or avoid one or more of the following: (i) excessive flow, (ii) inconsistent burden depth (e.g., depth of items buried under other items, so as not to be easily seen/sensed and/or grasped), (iii) item jamming (e.g., items jamming in the chute), (iv) relative motion of items (e.g., parcels bumping into each other), (v) robot(s) picking items relative to item flow (e.g., robots performing pick operations faster than the item flow is inefficient due to robot duty cycle/down time; and item flow faster than robots can cause a jam/backup of items and make picking items more difficult for the robots), (vi) robotic perception of incoming flow, and (vii) data analysis of the incoming flow of items. The system comprises a vision system (e.g., one or more sensors) and a flow of items that is too deep, too fast, or too cluttered make it harder for the vision system to be used to perceive items and for a plan for grasping individual items being developed.

In various embodiments, a dynamically adjustable infeed gating system is provided to control the flow of items, e.g., through an intake chute or other intake structure or conveyance. A computer vision system and/or other sensors are used to monitor the flow of items through the chute, to a picking location, etc. A robotically controlled structure is provided and used to regulate the admission of items to the flow area (e.g., chute) under robotic control in a fully autonomous mode without human intervention.

Various embodiments control and/or regulate a flow of items at the chute in connection with improving the predictability of the workspace (e.g., a set of items in the workspace), the distribution of items in the workspace, the ease with which a robotic item may pick/place and item from/to the workspace, the efficiency of the robotic item in connection with moving items from/to the workspace, etc. According to various embodiments, the system controls and/or regulates a flow of items through a plurality of flow channels and/or characteristics of the pick area to which the flow channels deliver the items (e.g., a density of items, a distribution of items, a number of items, etc.). The system controls/regulates the flow of items through the plurality of flow channels by controlling a gating structure in connection with actuating one or more gating elements configured to gate the flow of items to/through a flow channel. A flow channel may have a single corresponding gating element or a plurality of gating elements.

In some embodiments, the gating system includes a plurality of dynamically actuated gating elements. The plurality of gating elements may be individually controllable or individually controlled in subsets (e.g., a first subset is individually controlled with respect to a second subset).

In some embodiments, the system comprises one or more sensors that provide robotic perception of one or more of the pick area state, an infeed area state, and a chute or other conveyance structure that delivers items from the input source (e.g., the infeed area) to the pick area. The system uses the sensor data (e.g., sensor data for the infeed area and sensor data for the pick area) in connection with dynamically controlling one or more gating elements of the infeed gating system (e.g., to mediate/regulate flow of items in the chute).

In some embodiments, the system comprises a plurality of robotic arms that are configured to perform pick operations with respect to items in the pick area. For example, robotic arms may be disposed on opposing sides of the pick area. The system controls the plurality of robotic arms to operate the robotic arms in coordination, such as to avoid collisions between robotic arms while performing pick operations. The system may control item flows to different parts of the pick area to deliver items to a specific robot. For example, the system manages flow channels for the plurality of robots. For example, the system individually controls one or more of the gating elements to infeed items to the pick area to retain optimal flow (or a flow that satisfies one or more predefined flow criteria) to all robots simultaneously.

In some embodiments, the system performs data analysis of an incoming flow of items. The system dynamically controls the infeed gating system based at least in part on one or more characteristics of the incoming flow. For example, the system determines a particular gating element(s) to actuate to change a state of the gating element(s) based at least in part on the one or more characteristics of the incoming flow. In some embodiments, the system performs a machine learning process to train a model for controlling gating element(s) based on the incoming flow, the state of the pick area, the state of the infeed area, and/or the robotic arm(s) performing pick operations for items in the pick area.

According to various embodiments, the flow of the item(s) at the chute may be controlled based at least in part on changing a state/configuration of a gating structure. The gating structure comprises a plurality of gating elements that may be configured in an open state, a closed state, or a transitioning state between the open and closed states. At least a subset of the plurality of gating elements may be individually controllable. For example, in some implementations each of the plurality of gating elements are individually controllable (e.g., the control of a first gating element may be independent of control of a second gating element). As another example, in some implementations, subsets of the plurality of gating elements are individually controllable (e.g., a first subset of gating elements may be controlled independent from a second subset of gating elements). The system selectively controls the plurality of gating elements to mediate/regulate the flow of items through the chute to the pick area from which a pick operation is performed with respect to the items. For example, the system selectively controls one or more of the gating elements to change the orientation or geometry of the chute (e.g., to permit, impede, or block the flow of items to the pick area).

According to various embodiments, an infeed gating system is disclosed. The infeed gating system comprises (i) a gating structure configured to use a plurality of gate elements to mediate a flow of items from an input source to a pick area, (ii) a sensor configured to provide a sensor output associated with the pick area, and (iii) a processor configured to provide a control input to the gating structure to adjust a configuration of one or more of the plurality of gating elements based at least in part on the sensor output. At least a subset of the plurality of gate elements are individually controllable. For example, the processor may control a first subset of the plurality of gate elements individually from control of a second subset of the plurality of gate elements.

According to various embodiments, the flow of the item(s) at the chute may be controlled based at least in part on changing a state of one or more gating elements in the gating structure. The system may selectively control a subset of the gating elements to permit, restrict, or impede the flow of items based on a manner by which the system determines the flow of items is to be changed. For example, in response to determining that the flow of the items at the chute is to slowed or stopped, the system sends a control signal to cause one or more gating elements to transition to a closed state.

In some embodiments, the system obtains information associated with the workspace and uses such information in connection with determining whether and/or how to control the flow of items at the chute. The information associated with the workspace may include data associated with one or more items in the workspace, such as a plurality of items to be moved by the robotic arm from the source location (e.g., the pick area for the chute or infeed gating system) to the destination location. The data associated with the one or more items in the workspace may include a density of items in the workspace, a number of items in the workspace, a measure of flow to/from or through the workspace, etc. Various other values pertaining the one or more items in the workspace may be obtained (e.g., values that may be used in connection with determining an ability of the robotic arm to pick/place items from/to the workspace, an ease with which the robotic arm may pick/place the items, etc.). The system may obtain the information associated with the workspace based at least in part on data (also referred to herein as sensor data) obtained by one or more sensors (e.g., an image system such as a 2D/3D camera, a laser sensor, an infrared sensor, a sensor array, a weight sensor, etc.).

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In some embodiments, the system obtains the information associated with the workspace based on a model of the workspace (e.g., the workspace may be modeled based at least in part on the data obtained by the one or more sensors). For example, the robotic system generates a model of the workspace (e.g., a model including various items identified to be within the workspace, determining one or more characteristics of one or more items in the workspace, etc.). The robotic system may determine whether to control the flow of items at the chute based at least in part on the model of the workspace. In response to determining to control/regulate the flow of items at the chute, the robotic system may determine a strategy for controlling/regulating the flow of items, and/or implementing the strategy for controlling/regulating the flow of items. In some embodiments, the model of the workspace includes a model of a state of the infeed gating system (e.g., the input source, a part of the chute flowing items through the gating structure, state of the plurality of gating elements, etc.). The system may use the model of the state of the infeed gating system in connection with determining to control/regulate the flow of items at the chute and/or a strategy for controlling/regulating the flow of items.

According to various embodiments, the system includes a gating system (e.g., an infeed gating system) which the system controls to change a flow of items at the chute and/or state of the pick area to which the items are delivered via the chute. The gating system may be configured to selectively impede flow of items at (e.g., through) the chute, and/or to selectively improve flow of items at the chute. For example, the gating system selectively controls one or more gating elements to transition the gating elements to an open state, a closed state, or a transitioning state between the open state and closed state. The system may send a signal and/or an instruction to the gating system to cause one or more gating elements to change state to change a flow of the items at the chute. In response to receiving the signal and/or instruction, the infeed gating system may move the one or more gating elements (e.g., via driving a pneumatic piston, an electric motor, etc.) to control the flow of the items or state of the pick area. The gating system may be controlled to change the change a state of a subset of the gating elements, such as to cause a first subset of gating elements to be configured in an open state and a second subset of gating elements to be configured in a closed state.

In some embodiments, the infeed gating system comprises an actuation device(s) (e.g., an actuator) with which one or more gating elements is controlled (e.g., actuated). Examples of actuation devices include a motor, a piston, and the like. As an example, in the case of the gating element comprising a flap or panel, the actuation device may include a motor and/or piston that is operatively connected to the flap. In response to a control signal (e.g., from the robotic system), the motor and/or piston may apply a force on the flap to cause the flap to move/rotate. Accordingly, the robotic system may control the movement/orientation of the flap via the actuation device and may correspondingly control the flow of items through the at the chute (e.g., by controlling passage through the corresponding gate).

In some embodiments, the system determines an infeed of items at the right timing to optimize throughput (or to attain a throughput satisfying a throughput criterion), and controls the gating elements to allow or block the feed of items to the pick area.

In some embodiments, the system controls the actuation of the gating elements in a gating structure to configure the gating elements in an open position, a closed position, or a semi-open position. The system determines the subset of gating elements to actuate and an extent to which the gating elements are actuated, such as a period of time over which the gating element is to be in an open state or a closed state, etc. The system determines the timing of actuating the gating elements to infeed a select number of items without affecting the picking throughput of the robot. The system may use sensor data obtained by a vision system to detect item size or other item attributes in connection with determining the number or set of items to infeed to the pick area.

In some embodiments, the system uses sensor data to detect a log jam or other blockage of items in the chute or other conveyance structure from the gating structure to the pick area. For example, the system determines to configure one or more gating elements in an opened state to allow additional items to flow towards the jam/blockage. The flow or surge of items may break the log jam and the items may correspondingly be delivered to the pick area.

FIG. 1 is a diagram illustrating a robotic singulation system according to various embodiments. In the example shown, system 100 includes a robotic arm 102 equipped with a suction-based end effector 104. While in the example shown the end effector 104 is a suction-based end effector, in various embodiments, one or more other types of end effectors may be used in a singulation system as disclosed herein, including without limitation a pinch-based end effector or other types of actuated grippers. In some embodiments, end effector 104 comprises one or more suction-based ends (e.g., one or more suction cups). In various embodiments, the end effector may be actuated by one or more of suction, air pressure, pneumatics, hydraulics, or other actuation. The robotic arm 102 and end effector 104 are configured to be used to retrieve parcels or other items that arrive via chute 106 or bin and place each item in a corresponding location on segmented conveyor 108. In this example, items are fed into chute 106 from an infeed end 110. For example, one or more human and/or robotic workers may feed items into infeed end 110 of chute 106, either directly or via a conveyor or other electro-mechanical structure configured to feed items into chute 106. In some embodiments, system 100 comprises an infeed gating system (not shown) that is dynamically controlled (e.g., by control computer 112) to mediate/regulate the flow of items in chute 106 to pick area 150 from which robotic arm 102 picks items. Chute 106 may comprise or a conveyor that conveys items to the chute (e.g., via infeed end 110) may comprise a gating element(s) with which the flow of items may be controlled (e.g., by the control computer 112, etc.).

In the example shown, one or more of robotic arm 102, end effector 104, and conveyor 108 are operated in coordination by control computer 112. In various embodiments, a robotic singulation as disclosed herein may include one or more sensors from which an environment of the workspace is modeled. The one or more sensors obtain information with respect to an infeed area, chute 106, and a pick area. The one or more sensors may also capture information pertaining to an infeed gating system that mediates/regulates flow of items in chute 106 (e.g., the sensors obtain respective states for a plurality of gating elements). In the example shown in FIG. 1A, system 100 includes image sensors, including in this example 3D cameras 114 and 116. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 112 includes a workspace environment state system such as a vision system used to discern individual items, debris on the workspace, and each item's orientation based on sensor data such as image data provided by image sensors, including in this example 3D cameras 114 and 116. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). System 100 may use information obtained by the sensors (e.g., sensors within the workspace such as camera 114 and/or camera 116) to model the workspace, model the flow of items in the chute, determine properties of one or more items within the workspace/chute, determine a density of items within the chute/workspace, etc. In some embodiments, the information obtained by the sensors (e.g., sensors within the workspace such as camera 114 and/or camera 116) is used to control/regulate the flow of items to the workspace (e.g., to or within chute 106) such as to determine a manner by which a gating element(s) in an infeed gating system (not shown) is to be controlled.

The workspace environment state system produces output used by the robotic system to determine and implement a plan to autonomously operate a robotic structure to pick one or more items from the workspace (e.g., from a pick area) and place each in a corresponding available defined location for machine identification and sorting, such as a partitioned section of segmented conveyor 108. In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state or condition (e.g., implement a change on how an item is singulated, implement to reconfigure items within the source pile/flow to make grasping a selected item easier, etc.).

In various embodiments, a robotic system as disclosed herein includes and/or does one or more of the following, e.g., by operation of a control computer such as control computer 112:

- Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system may determine characteristics of one or more items and/or debris or other abnormalities in the three-dimensional view of the workspace.
- Robotic system coordinates operation of multiple robots to avoid collisions, getting in each other's way, and contending to pick up the same item and/or place an item in the same destination location (e.g., segmented part of the conveyor) as another robot. The robotic system may coordinate operation of a plurality of robots operating within the same workspace to singulate a plurality of items. For example, the robotic system may coordinate operation of the plurality of robots to enable the plurality of robots to operate independently to pick and place items. If a risk of collision is detected, responsive action is taken to ensure the plurality of robots do not collide with one another during singulation.
- Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.
- Two or multiple robotic system coordinates to pick up objects that are too heavy or too large for one robotic system to handle.
- The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In the event two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Control conveyor movement and/or speed as needed to avoid empty locations and achieve a desired robot productivity (throughput).

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

In response to a determination that debris is in the workspace and/or interfering with singulation of one or more items, perform an active measure to move/remove the debris, or to reconfigure an item to be singulated (e.g., to improve the likelihood that the item is successfully picked from the source pile/flow and placed on the conveyance structure).

In response to a detected state or condition, perform an active measure to move/remove the debris, or to reconfigure an item to be singulated (e.g., to improve the likelihood that the item is successfully picked from the source pile/flow and placed on the conveyance structure). For example, a chute conveyor is operated (e.g., under robotic control) to bring an item selected for singulation closer to a front of the chute (e.g., towards a pick area, such as pick area 150) for quicker and easier access by the robotic arm.

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Determine a movement and speed of the robotic arm that singulates an item based at least in part on a speed of a conveyor belt.

Use sensor data to determine whether to control a flow of items to the workspace, and in response to determining to control the flow of items, controlling the gating element(s) (e.g., to move/re-orient the gating element(s)). A strategy for controlling the flow of items at the chute may be determined, and the system may implement the strategy, including communicating a signal or instruction to the gating element(s).

Determine a trajectory of the item to be singulated based at least in part on one or more of a characteristic of the item, a characteristic of the workspace environment, and/or a characteristic of the conveyance structure (e.g., a speed of the conveyor belt or the size of the item).

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

The boundaries of the items may be used in connection with determining a density of the items within the workspace. Further, the boundaries of the items (or the density of the items within the workspace) may be used in connection with determining to control the flow of items to/within the workspace such as via controlling an infeed gating system (e.g., one or more gating elements of the infeed gating system). In response to determining the boundaries of the items, the system may determine that an expected difficulty with which the robotic arm is expected to grasp an item from the workspace. The difficulty may correspond to a likelihood that the robotic arm successfully grasps/picks up an item from the workspace.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while grasping the item, the robotic structure performs an active measure to change or adapt to the "tenting" or to the determination of the packaging of the item (e.g., a determination of a type of packaging, a material of the packaging, etc.). As an example, the robotic structure performs an active measure to partially lift the package and drag the package from the chute to the corresponding slot in the conveyance structure.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc.

According to various embodiments, the one or more cameras serve various purposes. The one or more cameras may provide a richer full 3D view into the scene (e.g., the workspace). In addition, or alternatively, the one or more cameras may operate in cohesion to minimize the errors due to package shininess when light reflecting off a package and into a camera may disrupt operation of such camera; in this case another camera disposed at a different location provides a backup. In some embodiments, the one or more cameras may be selectively triggered by a predictive vision algorithm that determines which camera has the best viewing angle and/or lowest error rate for picking a particular package. Accordingly, the robotic system may operate using information pertaining to an item that is obtained from the one or more cameras that are optimal (e.g., among the plurality of cameras within the workspace) for looking at the item. In some embodiments, one or more cameras are mounted on an actuated base, of which the system can change the position and orientation to provide a more optimal perception (e.g., view) of a package.

In some embodiments, the robotic system may select a field of view of one or more cameras. The field of view of each camera may be selected (e.g., determined) to increase the object segmentation quality by intentionally filtering out parts of the field of view as well as increasing the segmentation speed by reducing computation on a larger field of view.

Another purpose served by cameras, in various embodiments, is to detect any sort of unforeseen error in robot operation or any disruption to the environment. Cameras placed on the robot and on the environment have different error and accuracy profiles. The cameras on the robot can be more accurate since they are rigidly fixed to the robot but slower to use since using them requires the robot to slow down or stall. Cameras in the environment have a stable view and are effectively faster since the robot can multi-task and do something else while a camera is taking a photo. But if the camera stand is moved or shaken, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 100 may include one or more sensors other than or in addition to a plurality of cameras, such as one or more of an infrared sensor array, a laser array, a scale, a gyroscope, a current sensor, a voltage sensor, a power sensor, and the like. Referring to FIG. 1A, in various embodiments, robotic arm 102 is driven by one or more motors, e.g., one or more motors at each movable joint or mount location. In some embodiments, the work required to drive robotic arm 102 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 102 while the item is in its grasp. In various embodiments, the work required to drive the robotic arm 102 is measured using a current sensor, a voltage sensor, a power sensor, and/or the like, or some combination thereof. In response to determining the weight of the item during singulation, the robotic system may perform an active measure to adapt to the weight of the item. In some embodiments, in response to determining that the weight of the item is greater than a predefined threshold, robotic system 100 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces are between the item and end effector 104 as the robotic arm 102 is moved. Further, the shear forces can increase as the speed at which the robotic arm is operated increases (e.g., the speed at which the robotic arm moves the item). Accordingly, robotic system 100 can control the speed of the robotic arm 102 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 102 or the end effector 104.

Referring further to FIG. 1A, in the example shown, system 100 further includes an on-demand teleoperation device 118 usable by a human worker 120 to operate one or more of robotic arm 102, end effector 104, and conveyor 108 by teleoperation. In some embodiments, control computer 112 is configured to attempt to grasp and place items in a fully automated mode. However, if after attempting to operate in a fully automated mode control computer 112 determines it has no (further) strategies available to grasp one or more items, in various embodiments, control computer 112 sends an alert to obtain assistance from a human operator via teleoperation, e.g., by human operator 120 using teleoperation device 118. For example, in some embodiments, in response to detecting a state or condition affecting item flow through chute 106, control computer 112 may attempt to perform one or more actions to facilitate singulation. If fully automated attempts to respond to the detected state or condition are determined not to have resolved the state or condition, control computer may prompt human operator 120 to address the state or condition, e.g., via teleoperation using on-demand teleoperation device 118. In various embodiments, control computer 112 may display a user interface or other interface that identifies the state or condition and/or presents human selectable options to control the robotic arm 102, end effector 104, and/or other elements and instrumentalities as disclosed herein (e.g., blowers, shakers, chute conveyors, etc.) to alter the state or condition.

In various embodiments, control computer 112 uses image data from cameras such as cameras 114 and 116 to provide a visual display of the scene to human worker 120 to facilitate teleoperation. For example, control computer 112 may display a view of the pile of items in chute 106. Segmentation processing is performed by control computer 112 on image data generated by cameras 114 and 116 to discern item/object boundaries. Masking techniques may be used to highlight individual items, e.g., using different colors. The operator 120 may use the visual display of the scene to identify the item(s) to be grasped and use teleoperation device 118 to control the robotic arm 102 and end effector 104 to pick the item(s) from chute 106 and place each in a corresponding location on conveyor 108. Once the item(s) for which human intervention was prompted have been placed on the conveyor, the system 100 resumes fully automated operation. In the event of human intervention, the robotic system observes the human worker (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 100 invokes assistance from human operator 120 in response to determining that an abnormality in the operation of system 100 exists. An example of an abnormality is a lack of a threshold pressure being attained between end effector 104 and the item during singulation of the item. In response to detecting that the pressure attained between end effector 104 and the item is less than a threshold pressure value, robot system 100 can perform a diagnostics process in connection with assessing whether robot system 100 is performing normally. For example, system 100 can perform a diagnostic of the ability of end effector 104 to engage an item and attain a predetermined threshold pressure value. In response to determining that system 100 is not performing normally (e.g., that the end effector 104 is not able to engage an item and attain a predetermined threshold pressure value), system 100 invokes assistance from human operator 120. In some embodiments, control computer 112 sends an alert to human operator 120. The alert can indicate the basis of the problem (e.g., an indication that the end effector is unable to engage the item and attain a predetermined threshold pressure value). For example, the alert can provide a recommended or requested remedial action to human operator 120.

Figure 2:
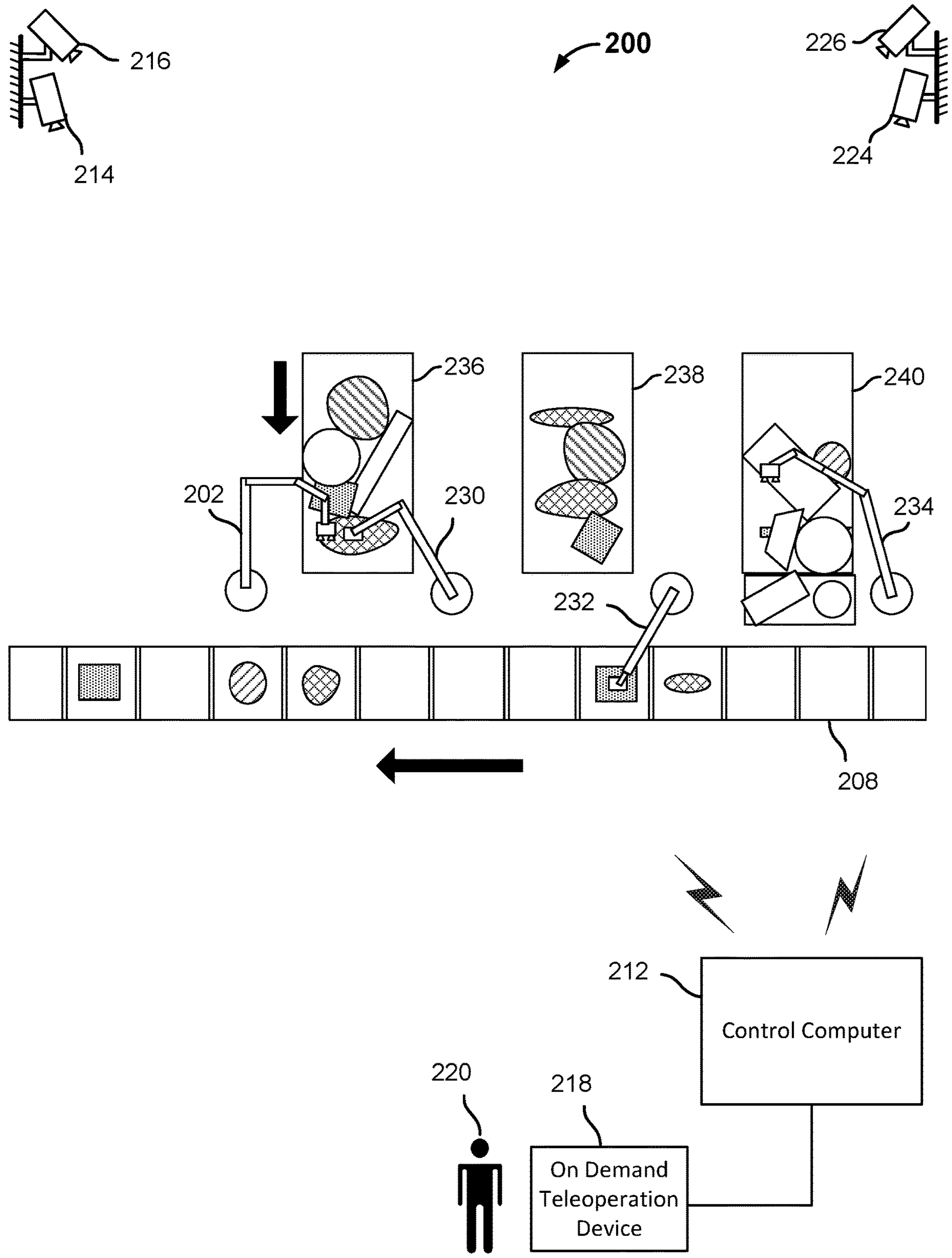
FIG. 2 is a diagram illustrating a robotic singulation system according to various embodiments.

FIG. 2 is a diagram illustrating a robotic singulation system according to various embodiments. In various embodiments, control computer 212 coordinates operation of the four robotic arms 202, 230, 232, and 234 and associated end effectors, along with conveyor 208, to pick/place items from the chutes 236, 238, and 240 to conveyor 208 in a manner that achieves a desired collective throughput of the system (e.g., a collective throughput that satisfies a throughput threshold, etc.).

While in the example shown in FIG. 2 the stations for chutes 238, 240 have one robotic arm, in various embodiments two or more robots may be deployed at a station such as robotic arm 202, 230 at the station. The robotics are operated under control of an associated control computer, such as control computer 212 in the example shown in FIG. 2, in a manner that avoids the robots interfering with each other's operation and movement and which maximizes their collective throughput, including by avoiding and/or managing contention to pick and place the same item.

In some embodiments, control computer 212 controls an infeed gating system(s) (not shown) that controls the flow of items via the chute to the corresponding pic area. For example, control computer 212 controls the infeed gating system to configure a gating element in an opened state, a closed state, or a transitioning state between the opened state and the closed state. Control computer 212 controls the infeed gating system in connection with regulating the flow of items through the chute or characteristics of the set of items in the pick area (e.g., a density of item in the pick area, a number of items in the pick area, a distribution of items in the pick area, a pile depth of items in the pick area, etc.). In the event that a station has a plurality of robots that are controlled to pick items from a particular pick area, control computer 212 controls the infeed gating system to configure the gating elements based on the state of each robot. For example, a first part of the pick area may be assigned to a first robot and a second part of the pick area may be assigned to a second robot. Control computer 212 controls the infeed gating system to regulate flow of items to the first part of the pick area or to configure a characteristic(s) of the set of items in the first pick area (e.g., attain desired characteristics of a set of items) based on a state of the first robot or plan for controlling the first robot to pick items from the first part of the pick area. Control computer 212 similarly controls the infeed gating system to regulate flow of items to the second part of the pick area or to configure a characteristic(s) of the set of items in the second pick area. Control computer 212 can thus independently control (e.g., regulate) the flow of items or a characteristic of a set of items in a particular pick area (or subset of the pick area) for the plurality of robots at the station.

In some embodiments, a plurality of robotic arms operating at the same workspace (e.g., robotic arms 202, 230) work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. In some embodiments, control computer 212 implements/enforces “force fields” between two or more robots in order to prevent collisions between the two or more robots. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot.

In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subsets of the plurality of robots that picks after a first robot will select an item to singulate that is different from the item selected or picked by the first robot.

In various embodiments, a robotic system as disclosed herein coordinates operation of multiple robots to one-by-one pick items from a source bin or chute and place the items on an assigned location on a conveyor or other device to move items to the next stage of machine identification and/or sorting.

In some embodiments, multiple robots may pick from the same chute or other source receptacle. In the example shown in FIG. 2, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, system 200 manages a distributed data structure pertaining to the operation of a plurality of robots in system 200 and/or a state of the conveyance structure. For example, the distributed data structure may include one or more fields associated with each slot in the conveyance structure. The distributed data structure operates at a speed far in excess of the speed at which robots in system 200 operate. For example, the distributed data structure operates (e.g., is updated) on the order of 1 μs or 1 ms, and time at which the robots physically operate/move is on the order of 100 ms. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). The relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot. In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). If the robot receives an error in connection with an attempt to write information to the distributed data structure, e.g., to claim a slot on the conveyor for its use, the robot waits a predetermined interval and re-attempt to write such information to the distributed data structure. If the data cannot be written because another robot has already written data to that location, e.g., already claimed an associated slot on the output conveyor, the robot chooses another slot determined to be available by reading another location in the data structure. In response to the data structure being updated by one robot, the data structure is automatically updated with respect to one or more other robots within system 200. For example, in response to determining that an update (e.g., a write or delete operation)

is performed, the update is distributed to the other robots within system 200. The distributed data structure may be a shared structure that all robots read, or a robot (e.g., each robot) may store a local copy and disseminate updates across the system to other robots. For example, the robotics may synchronize modifications to the data structure (e.g., updates such as plans or reserved slots on the conveyor) to other robots within the system.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. When a robot is determining (or updating) a plan to singulate an item (e.g., when control computer 212 is determining the plan), a slot on the conveyance structure is reserved. The slot in the conveyance structure is reserved based at least in part on the distributed data structure pertaining to the state of the conveyance structure. For example, a slot associated with a field indicating that the slot is empty or unreserved can be reserved for singulation of an item. Occasionally, a robotic arm can erroneously release an item in a slot different from a slot that corresponded to the singulation plan, or in a manner that the item straddles two slots (e.g., adjacent slots). The corresponding robot (or a downstream robot) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 (e.g., control computer 212) can select a slot, from among the set of slots, that is empty or not reserved as a slot in which the item is to be singulated. The timestamp and the speed of the conveyor are used because system 200 can determine one or more slots with which the item being singulated can be caused to intersect based on operating the corresponding robot.

Figure 3A:
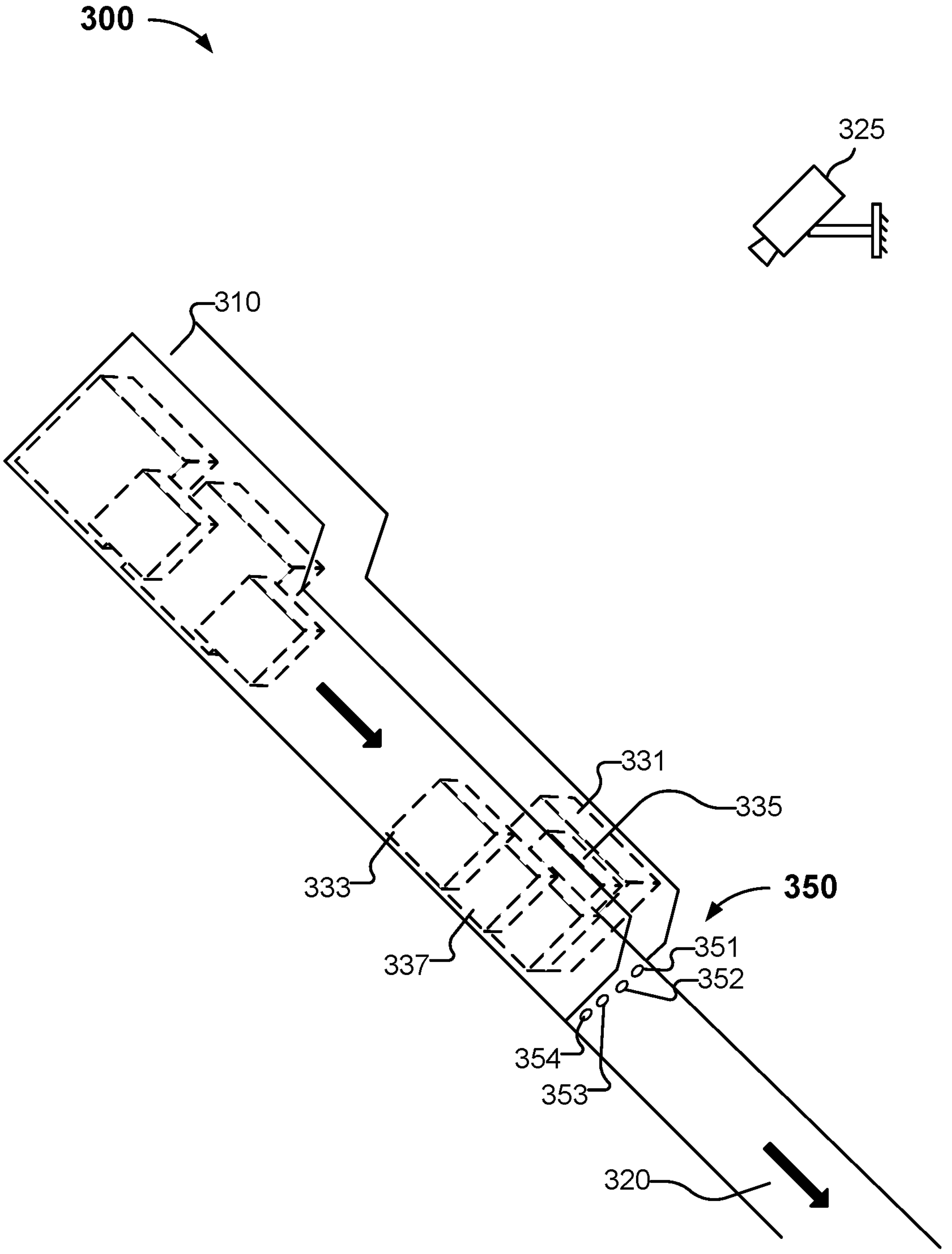
FIG. 3A is an example of an infeed gating system controlled to mediate a flow of items according to various embodiments.

FIG. 3A is an example of an infeed gating system controlled to mediate a flow of items according to various embodiments. In the example shown, infeed gating system 300 comprises gating structure 350. In some embodiments, gating structure 350 is a gating mechanism to regulate/mediate flow in the chute and/or characteristics of a set of items in a corresponding pick area, such as density of items, distribution of items, volume of items, number of items, pile depth of items, etc.

Infeed gating system 300 may comprise a control computer, such as control computer 112 of system 100 or control computer 212 of system 200, to control gating structure 350. For example, infeed gating system 300 uses the control computer to control a configuration of one or more gating elements of gating structure 350. In the example shown, gating structure 350 comprises a plurality of gating elements: first gating element 351, second gating element 352, third gating element 353, and fourth gating element 354. Various numbers of gating elements or types of gating elements may be implemented. Examples of gating elements include a bollard, a shaft, a paddle, a bladder, a ramp, a panel, etc. In the examples shown in FIGS. 3A-3D, the gating elements correspond to bollards.

In some embodiments, infeed gating system 300 controls the plurality of gating elements of control gating structure 350 collectively or independently. Collective control of the plurality of gating elements may include simultaneously controlling the gating elements to be configured in a particular configuration (e.g., opened, closed, semi-opened/semi-closed). Independent control of the plurality of gating elements may include (i) controlling each gating element independent from other gating element(s) of gating structure 350, or (ii) controlling subsets of gating elements independently, where the gating elements in a subset of gating elements are controlled collectively but independent of another subset of gating elements.

As illustrated in FIG. 3A, infeed gating system 300 controls the flow of items from an input source to a pick area, such as by controlling the flow of one or more items from a first chute component 310 to a second chute component 320. In some embodiments, infeed gating system 300 controls the flow of items by actuating one or more of gating elements 351, 352, 353, 354 via driving a pneumatic piston, an electric motor, etc.

In some embodiments, infeed gating system 300 comprises one or more sensors configured to obtain sensor data pertaining to the workspace. In the example shown, infeed gating system 300 comprises sensor 325. Sensor data 325 may be a vision system. For example, sensor 325 may be a 3D camera, etc. Various other sensors may be implemented. For example, infeed gating system 300 includes a sensor to determine a configuration of a gating element (e.g., a gate sensor), etc. The sensor data pertaining to the workspace includes one or more of (i) a sensor output associated with the pick area, (ii) a sensor output associated with a flow of items through the chute (e.g., first chute component 310 and/or second chute component 320), (iii) a sensor output associated with a state of gating structure 350, (iv) a sensor output associated with a robotic arm in the workspace (e.g., a robotic arm that picks items from the pick area), and/or (v) sensor output associated with items in the workspace (e.g., identifiers or markings on the items, dimensions of the items), etc. Various other types of sensor output may be obtained by sensors in infeed gating system 300 and used in connection with regulating the flow of items from the input source to the pick area.

In various embodiments, 3D cameras, force sensors, and other sensors and/or sensor arrays are used to detect and determine attributes of items to be delivered to the pick area or picked from the pick area. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of infeed gating system 300 and/or a robotic arm in proximity to the pick area.

Infeed gating system 300 (e.g., a control computer) generates a model of the state of the pick area, a flow of items in the chute, a state of gating structure 350, etc. The model(s) are a generated based at least in part on the sensor data. In some embodiments, infeed gating system 350 has prior knowledge (e.g., obtains) certain information pertaining to the items to be delivered to the pick area. For example, infeed gating system 300 obtains (e.g., from another system, such as a system that provides the items as an input source) an ordering of items, such as a rough approximation of an order in which items are expected to flow through the chute. As another example, infeed gating obtains an indication of characteristics of the items, such as an identifier, a dimension, a weight, a packaging, a fragility, a rigidity, a shape, etc.

Infeed gating system 300 controls one or more gating elements of gating structure 350 based at least in part on the sensor data. For example, infeed gating system 300 determines a plan for controlling a gating element based on a model (e.g., a model of the flow of items, a model of the pick area, a model of a state of gating structure 350, etc.). As another example, infeed gating system 300 provides a control input to gating structure 350 to adjust a configuration of one or more of the plurality of gating elements based at least in part on the sensor data.

As illustrated in FIG. 3A, a plurality of items is flowing from the input source to the pick area, such as items 331, 333, 335, and 337 (e.g., items flowing in first chute component 310). Infeed gating system 300 may control gating structure 350 to regulate the flow of items 331, 333, 335, and/or 337 to the pick area (e.g., via second chute component 320). For example, infeed gating system 300 may control gating structure 350 to configure one or more of gating elements 351, 352, 353, and/or 354, such as to configure a gating element to a closed position in connection with impeding or restricting the flow of items.

Figure 3B:
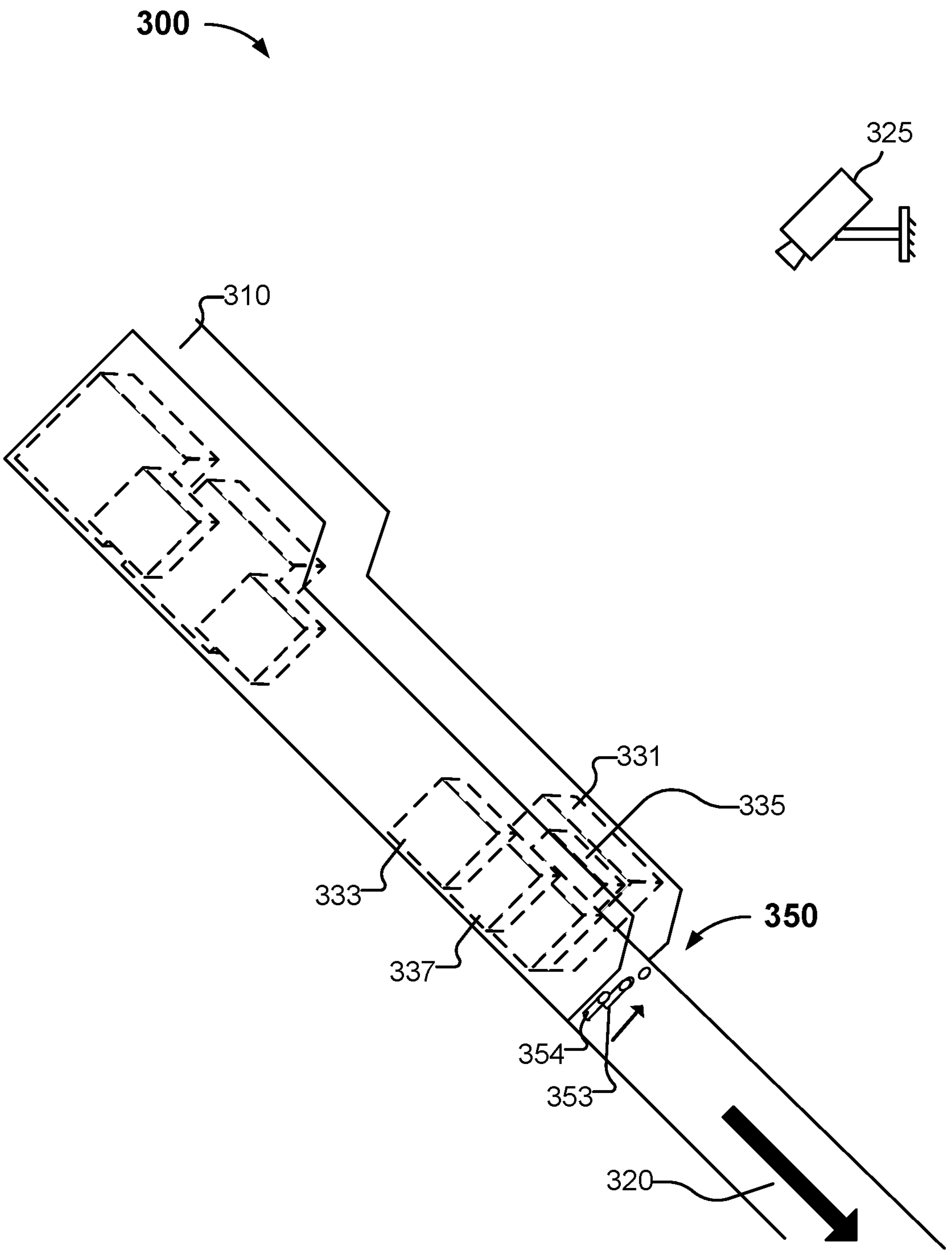
FIG. 3B is an example of an infeed gating system controlled to mediate a flow of items according to various embodiments.

FIG. 3B is an example of an infeed gating system controlled to mediate a flow of items according to various embodiments. In the example shown, infeed gating system 300 controls gating structure 350 to change a configuration gating elements 353, 354. For example, as illustrated in FIG. 3B, gating elements 353, 354 are configured to be moved to a closed position. Infeed gating system 300 may control the gating elements to be configured in a fully closed position or a partially closed position. FIG. 3B further illustrates that a first subset of gating elements 353, 354 are controlled independently of other gating elements. Gating elements 353, 354 may be controlled collectively as a subset of gating elements, or each of gating element 353, 354 may be controlled independently.

In some embodiments, infeed gating system 300 controls various combinations of gating elements independent from other gating elements. For example, infeed gating system 300 controls gating elements 351, 354 (e.g., gating elements that are relatively closer to the sides of the chute) to be configured in a closed position to restrict/impede flow of items at the edges of chute or to otherwise narrow a gap in gating structure 350 through which the items are permitted to flow. Gating elements 351, 354 may be controlled to be configured in the closed position to focus the flow of items towards a center of the chute, or center of the pick area. Accordingly, infeed gating system 300 may selectively control one or more gating elements to control the flow of items and/or distribution of items in the pick area.

Figure 3C:
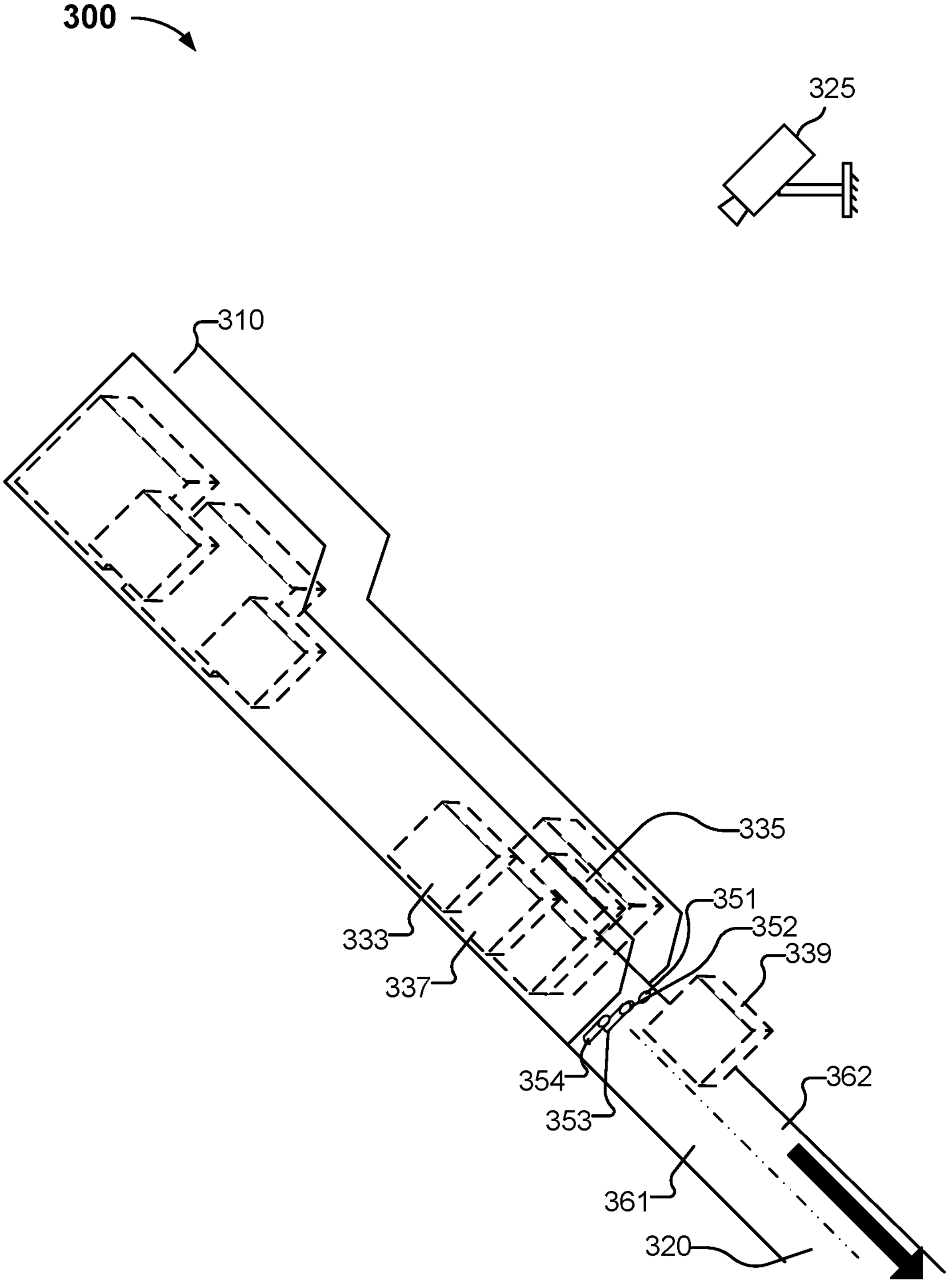
FIG. 3C is an example of an infeed gating system controlled to mediate a flow of items according to various embodiments.

FIG. 3C is an example of an infeed gating system controlled to mediate a flow of items according to various embodiments. In the example shown, infeed gating system 300 has controlled gating elements 353, 354 to restrict/impede the flow of items through gating structure 350 on the close side of the chute, and infeed gating system 300 configures, or maintains a configuration of, other gating elements to be in an opened position or semi-open position. Accordingly, gating structure 350 permits item 339 to flow through the gate, such as on a far side of the chute.

In some embodiments, infeed gating system 300 selectively controls one or more gating elements to regulate the flow of items, such as to independently control the flow of items in different flow channels. For example, infeed gating system 300 can effectively create different flow channels within the chute based on the selective control of different subsets of one or more gating elements. In the example shown, because infeed gating system 300 controls gating elements 353, 534 to be restrictive of flow (e.g., to be closed or semi-closed) and gating elements 351, 352 to be permissive of flow (e.g., to be in an open position), thereby effectively creating first flow channel 361 and second flow channel 362. Because gating elements 351, 352 are in the opened position, item 339 flows through second flow channel 362.

In some embodiments, the flow channels are respectively associated with a robotic arm that picks items from the pick area. For example, infeed gating system 300 controls the flow of items in first flow channel 361 to deliver items to a first robotic arm in the workspace. Similarly, infeed gating system 300 controls the flow of items in second flow channel 362 to deliver items to second robotic arm in the workspace.

In some embodiments, infeed gating system 300 creates/uses flow channels to selectively control delivery of items to parts of the pick area, such as in connection with controlling the item distribution in the pick area.

Figure 3D:
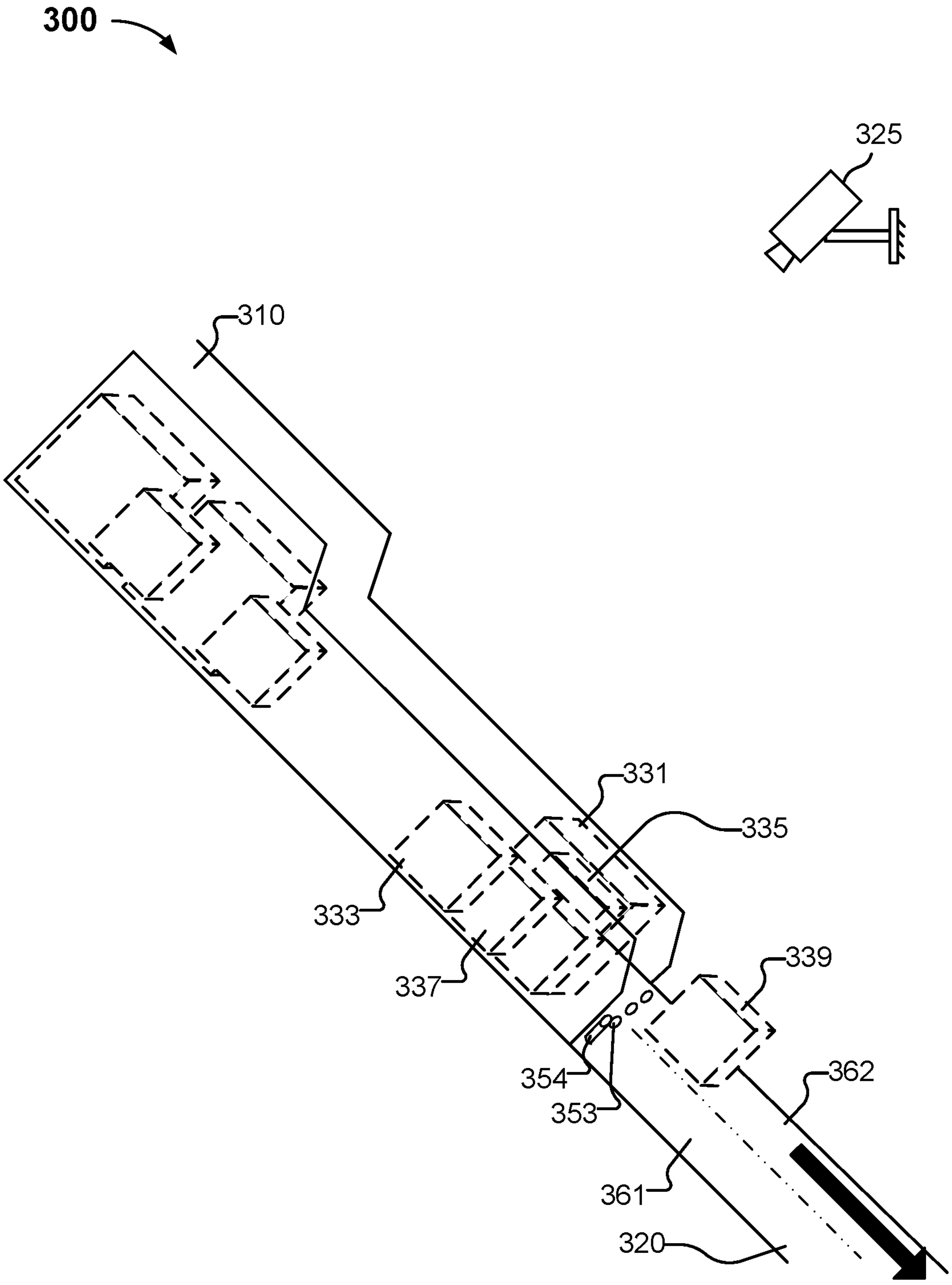
FIG. 3D is an example of an infeed gating system controlled to mediate a flow of items according to various embodiments.

FIG. 3D is an example of an infeed gating system controlled to mediate a flow of items according to various embodiments. In the example shown, infeed gating system 300 independently controls gating elements 353 and 354. As illustrated, gating element 354 is configured in a closed position (or semi-closed position) and gating element 353 is configured to be in an open position. As an example, if a wide box (e.g., an item having a width exceeding the width of second flow channel 362) is to flow through second flow channel 362, infeed gating system 300 controls gating element 353 to be in an open position to permit passage of the wide box.

Figure 4:
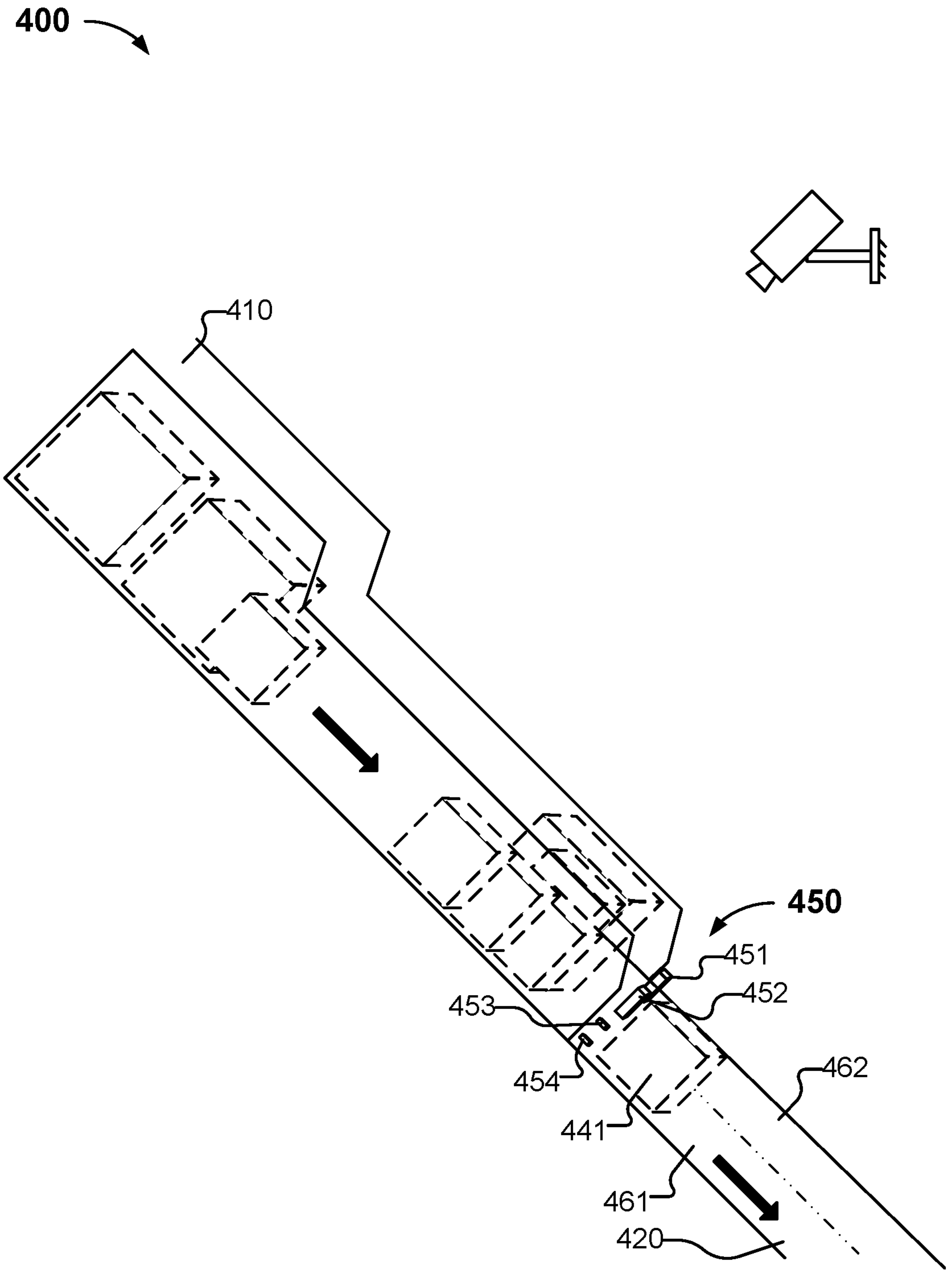
FIG. 4 is an example of an infeed gating system according to various embodiments.

FIG. 4 is an example of an infeed gating system according to various embodiments. In the example shown, infeed gating system 400 comprises gating elements 451-454 that are a different shape than gating elements 351-354 of infeed gating system 400. For example, gating elements 451-454 are square posts that may be actuated to raise/lower from a bottom surface of the chute. As shown, gating elements 451, 452 are configured in a closed position (e.g., the gating elements are raised relative to the bottom surface of the chute) and gating elements 453, 454 are in an open position (e.g., configured to be flush or recessed relative to the bottom surface of the chute).

Infeed gating system 400 selectively controls one or more gating elements 451-454 to regulate the flow of items from an input source to a pick area, such as from first chute component 410 to second chute component 420. For example, infeed gating system 400 controls gating structure 450 to permit the flow of items (e.g., item 441) in first flow channel 461 while restricting/impedes the flow of items in second flow channel 462.

Figure 5A:
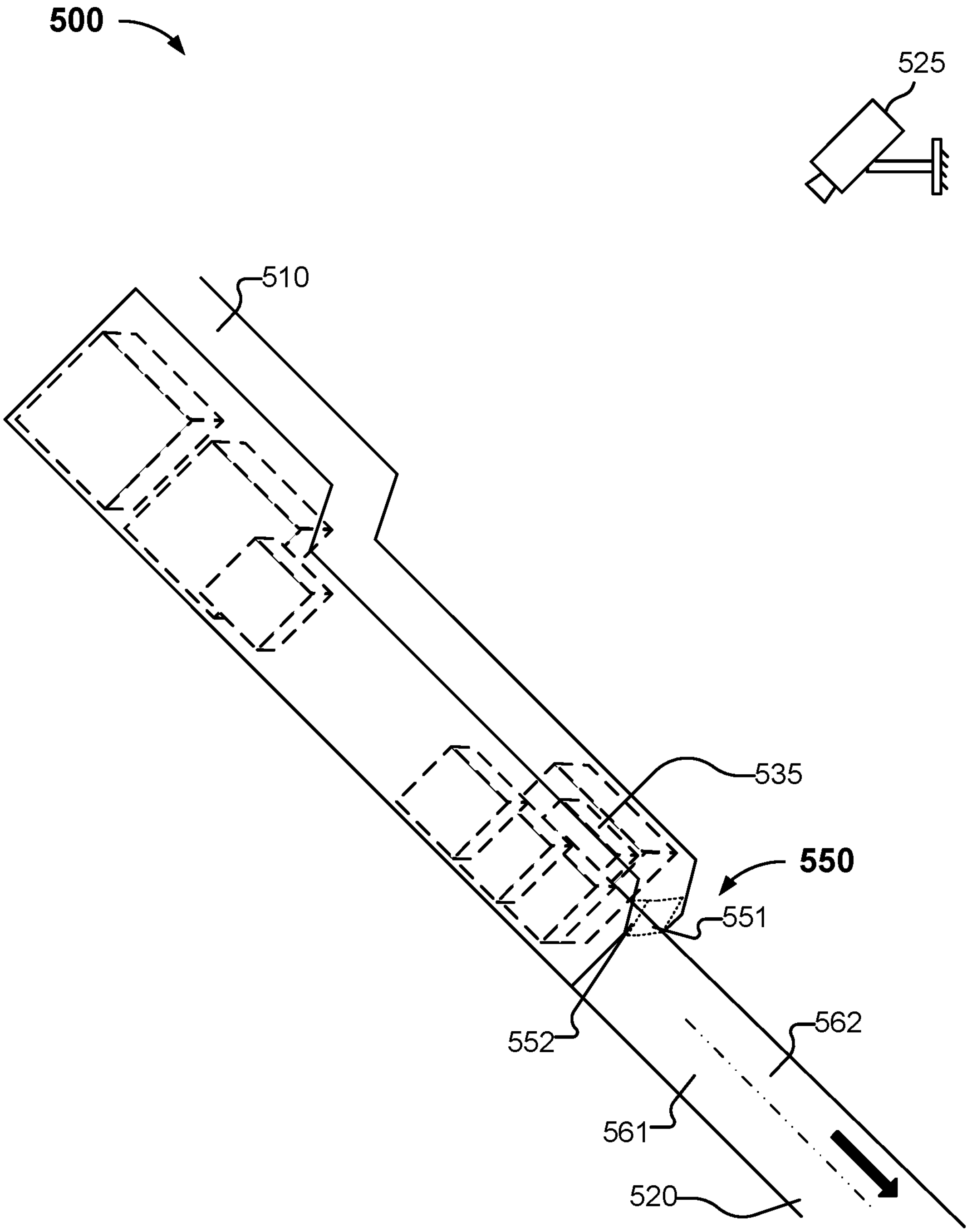
FIG. 5A is an example of an infeed gating system according to various embodiments.
Figure 5B:
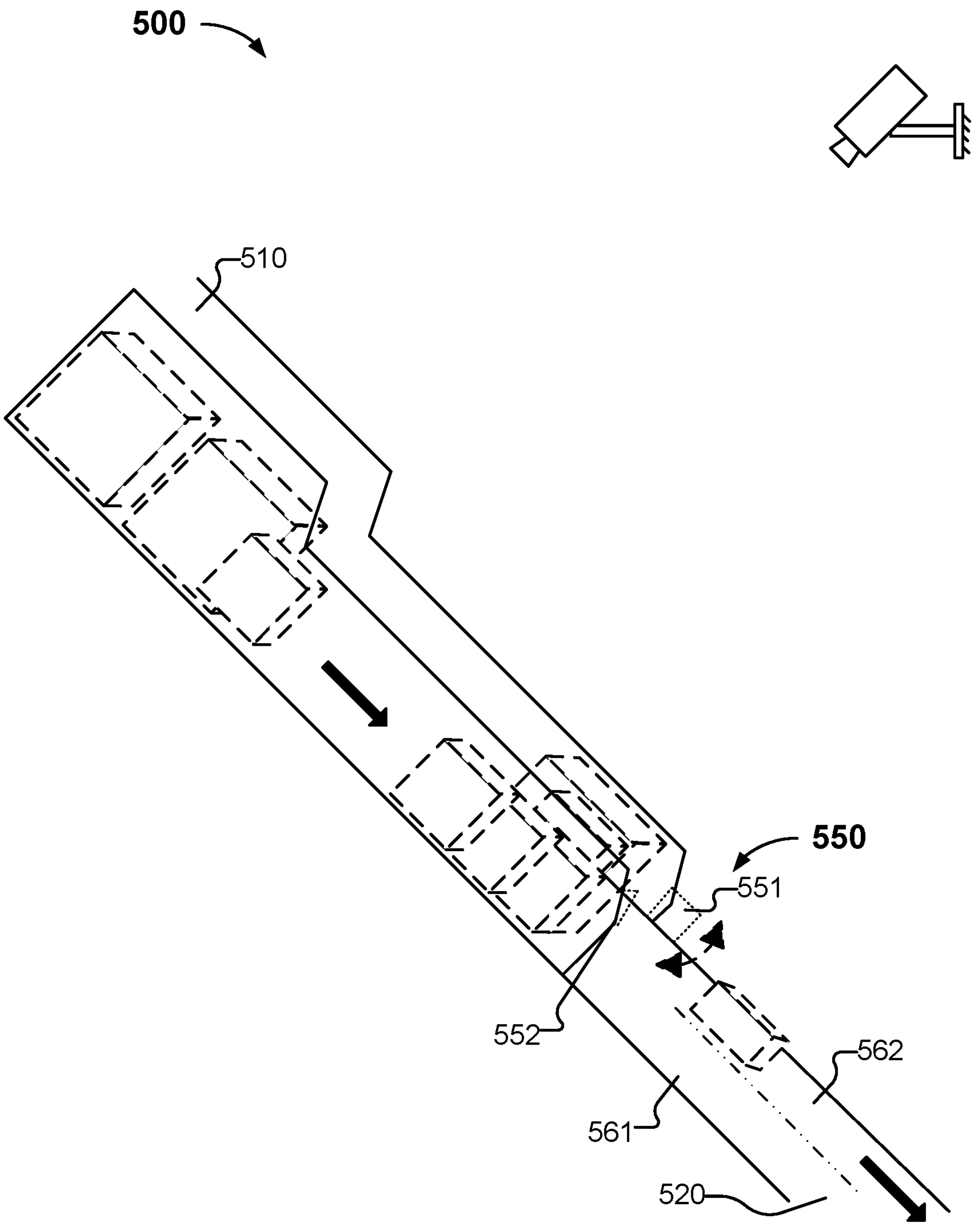
FIG. 5B is an example of an infeed gating system according to various embodiments.

FIGS. 5A and 5B are examples of an infeed gating system according to various embodiments. In the example shown, infeed gating system 500 comprises gating structure 550. Gating structure 550 comprises a plurality of gating elements 551, 552. As shown, gating elements 551, 552 are flaps that may be used as doors that permit the flow of items through the gate when in an opened position, or restrict the flow of items through the gate when in a closed position. Infeed gating system 500 selectively controls gating elements 551, 552 to control flow from first chute component 510 to second chute component 520 (e.g., to the pick area).

As illustrated in FIGS. 5A and 5B, gating elements 551, 552 may be controlled in connection with selectively controlling flow in first flow channel 561 and/or second flow channel 563. For example, FIG. 5A illustrates gating elements 551, 552 being configured in a closed position. FIG. 5B illustrates gating element 551 having been configured in an open position, for example, by infeed gating system 500 controlling to actuate a mechanism to open gating element 551. Accordingly, in the example shown, infeed gating system 500 controls gating structure 550 to permit the flow of items in second flow channel 562 and to restrict the flow of items in first flow channel 561.

Figure 6A:
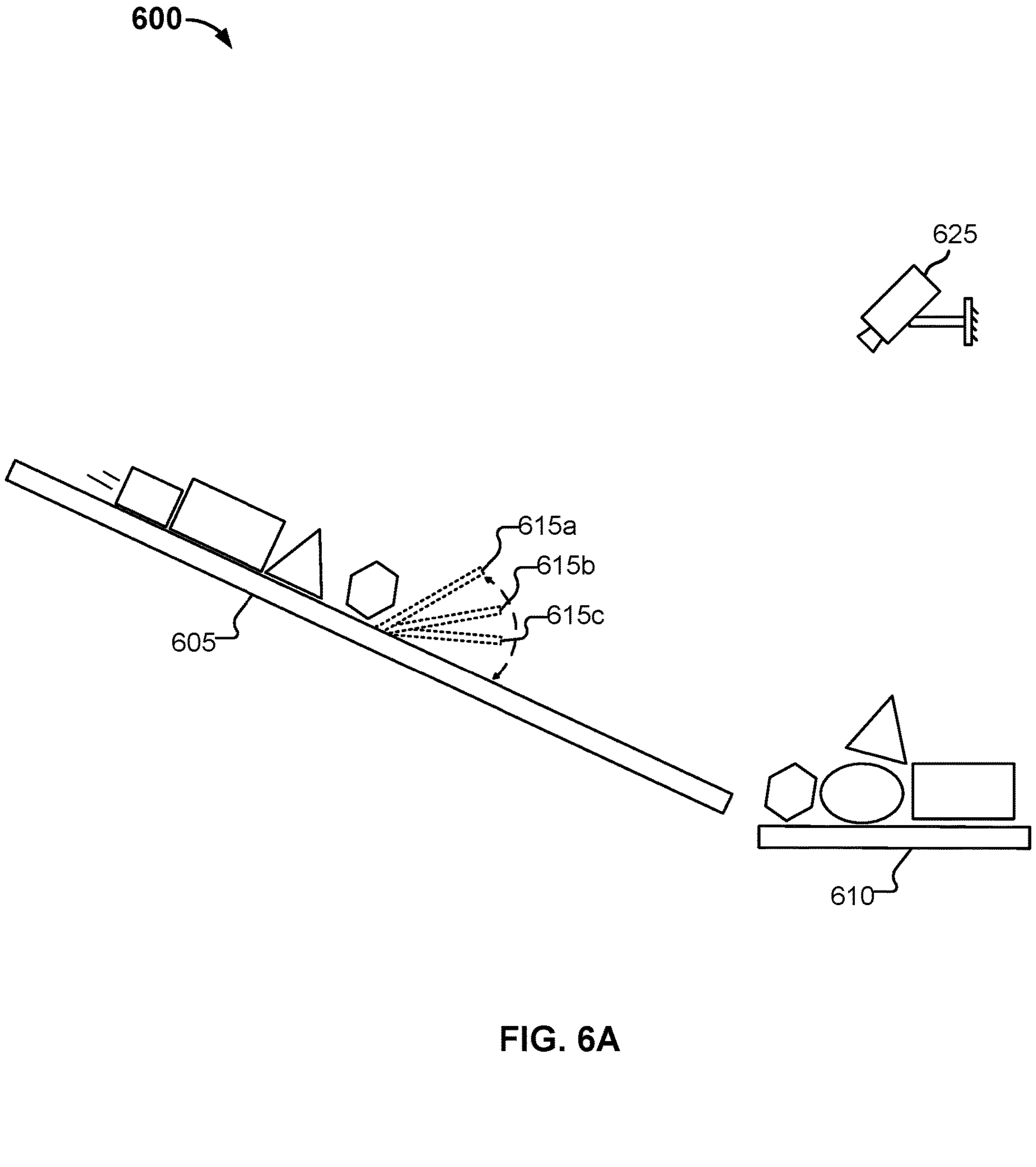
FIG. 6A is a side view of an example of an infeed gating system according to various embodiments.

FIG. 6A is a side view of an example of an infeed gating system according to various embodiments. According to various embodiments, system 600 (e.g., an infeed gating system) comprises a gating structure that includes a plurality of gating elements that are controlled to regulate the flow of items through a plurality of flow channels of a chute or other conveyance structure. Each of the plurality of gating elements may correspond to a particular flow channel. For example, each gating element may correspond to a different flow channel. As another example, subsets of one or more gating elements are associated with a particular flow channel such that a first subset of gating element(s) is associated with a first flow channel, and a second subset of gating element(s) is associated with a second flow channel. Because the example is shown as a side view, system 600 is described in connection with regulating/controlling the flow of items in a particular flow channel (e.g., by controlling one or more associated gating elements). However, system 600 may be extended to one or more other flow channels of the chute or other conveyance structure.

In the example illustrated in FIG. 6A, system 600 comprises a chute 605 that provides items to a workspace 610 (e.g., a pick area), and one or more sensors such as camera 625. System 600 may comprise various sensors including one or more of a camera, an infrared sensor array, a laser array, a scale, a gyroscope, a current sensor, a voltage sensor, a power sensor, a force sensor, a pressure sensor, a weight sensor, and the like. According to various embodiments, system 600 may control/regulate flow of items from chute 605 to workspace 610 in a particular flow channel. System 600 controls/regulates the flow of the items based at least in part on sensor data (e.g., information obtained by the one or more sensors). In some embodiments, system 600 controls the flow of the items from chute 605 to workspace 610 via a particular flow channel based on a control of the one or more gating elements associated with the particular flow channel (e.g., the gating elements that permit/impede/restrict the flow of items in the particular flow channel). As illustrated in FIG. 6A, the one or more gating elements may be controlled to vary an orientation/position of the gating element(s). The gating element(s) may be a flap or other such structure. The gating element(s) may be controlled to be positioned across varying positions such as position 615*a*, position 615*b*, and position 615*c*. For example, that gating element(s) may be controlled to permit items to flow through the gate (e.g., position 615*c*), to impede the flow of items through the gate (e.g., position 615*b*), and/or to restrict/stop the flow of items through the gate (e.g., position 615*c*).

According to various embodiments, system 600 controls the gating element(s) to be oriented at a particular position based on an extent or type of control/regulation to be implemented. System 600 may store a mapping of positions of the gating element(s) to an extent or type of control/regulation of the flow of items. For example, various positions may be mapped to various speeds of the flow or profiles of the flow (e.g., permitting items to singly flow over the gating element(s), causing the flow to be distributed as a single layer of item(s) such as without overlap or piling of items, etc.). As another example, a position of the gating element(s) may be mapped to a halting the flow of items such as if the gating element(s) is positioned to be perpendicular to the surface of the chute, or if the angle of the gating element(s) is too steep for an item to flow up/over the gating element(s). In the example illustrated in FIG. 8A, position 815*a* of the gating element(s) may correspond to a more restrictive control/regulation of the flow if items compared to position 615*b* and position 615*c*. For example, controlling the gating element(s) to orient the gating element(s) at position 615*a* may cause the speed of the flow of items and/or quantity of items in the flow that progresses to workspace 610 to be less than if the gating element(s) were in position 615*b* or position 615*c*. Similarly, controlling the gating element(s) to orient the gating element(s) at position 615*b* may cause the speed of the flow of items and/or quantity of items in the flow that progresses to workspace 610 to be less than if the gating element(s) were in oriented position 615*c*.

In some embodiments, system 600 uses a model that predicts an expected flow based on certain control of the gating element(s). The model may be a machine learning model that is trained based on the relationship among item characteristics (e.g., attributes), flow of items, and positioning/control of the gating element(s). System 600 queries the model in connection with determining a manner by which to control the gating element(s) to attain a desired flow or desired characteristics of items in the pick area. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

System 600 may further comprise a robotic arm (not shown) that moves the items from the workspace 610 (e.g., the pick area) to a destination location. In the context of a system that singulates items from the workspace 610, the destination location may be a segmented conveyor or a tray on a conveyor, etc. In the context of a system that kits items from workspace 610, the items on the workspace 610 may be further routed/conveyed to a kitting shelf system such as to a feeder portion to a kitting shelf system. In the context of a system that palletizes the items, the destination location may be a pallet (e.g., the workspace 610 may be an area from which the robotic arm picks the items, or the workspace 610 may be a conveyor that further conveys the items to within range of the robotic arm).

In various embodiments, system 600 may control the gating element(s) based at least in part data associated with a plurality within the workspace 610 (e.g., the pick area). The data associated with a plurality within the workspace 610 may correspond to, or be obtained based on, sensor data. The sensor data may be obtained based at least in part on information obtained by one or more sensors in system 600 such as a sensor(s) within proximity of workspace 610 (e.g., camera 625). In some embodiments, system 600 determines (e.g., generates) a model of the workspace, including a model of the plurality of items within workspace 610. The model may include information pertaining to one or more items within the workspace 610, information pertaining to the robotic arm, information pertaining to the gating structure, etc. The information pertaining to one or more items may include one or more attributes of at least one item (e.g., a size, shape, identifier, barcode, expected weight, expected center of gravity, type of packaging, etc.), a position of at least one item (e.g., a position relative to the workspace, a position relative to another item(s), etc.), a boundary or edge of at least one item, etc. System 600 may determine a characteristic/property associated with an item in the workspace 610, a set of items in the workspace 610, and/or a pile of items in the workspace 610. For example, system 600 may determine one or more of a density of items on at least part of workspace 610, a depth of items on at least part of the workspace 610 (e.g., an indication of whether an item is on top of another item, or whether an item at least partially occludes another item on the workspace, etc.), a stability of a set of items on the workspace (e.g., a stability of a pile of items in the workspace), a spacing between a set of items, an amount of empty space or space available for a further item(s), an expected number of items that may be added to the workspace before a threshold associated with the workspace (e.g., a threshold associated with one or more of the foregoing characteristics of the workspace and/or item(s) in the workspace), etc. System 600 may store one or more predefined thresholds associated with a characteristic/property associated with the workspace 610, an item in the workspace 610, a set of items in the workspace 610, and/or a pile of items in the workspace 610. For example, system 600 may store one or more predefined thresholds respectively associated with the foregoing characteristics/properties (e.g., density, spacing, and/or quantity of items, space available for further items, expected further/additional items that may be introduced to the workspace, etc.).

According to various embodiments, system 600 may determine to control the flow of items (e.g., control the gating element(s)) based at least in part the sensor data and/or one or more threshold associated with a characteristic/property associated with the workspace and/or one or more items within the workspace. The determination to control the flow of items may be based on a determination that a flow regulation condition has been satisfied (e.g., one of the one or more threshold associated with a characteristic/property associated with the workspace (e.g., the pick area) and/or one or more items within the workspace being satisfied, such as the threshold being exceeded, etc.). For example, in response to determining that a density of items in the workspace exceeds a threshold density value, system 600 may determine to control the flow of items (e.g., to at least temporarily halt or otherwise slow the flow of items). A flow regulation condition may exist for as long as the density of items exceeds the threshold density value. As another example, in response to determining that the workspace has space available for a certain number of items, system 600 may control the gating element(s) to regulate the flow of items (e.g., to permit the certain number of items to pass the gating element(s) and thereafter halt the flow of the items until additional space clears, to slow the flow of items such as to permit the robotic arm to reduce the number of items in the workspace or to clear additional space for more items, etc.). A flow regulation condition may exist for as long as space is still available for additional items to be introduced to the workspace, or for as long as space available is greater than a threshold space value, or smaller than threshold space value, as applicable. In some embodiments, in response to a determination that a flow regulation condition has cleared (e.g., no longer exists), system 600 may determine to change the control of the flow of items such as cease the control of the flow of items that was implemented in response to the flow regulation condition occurring, etc.

Figure 6B:
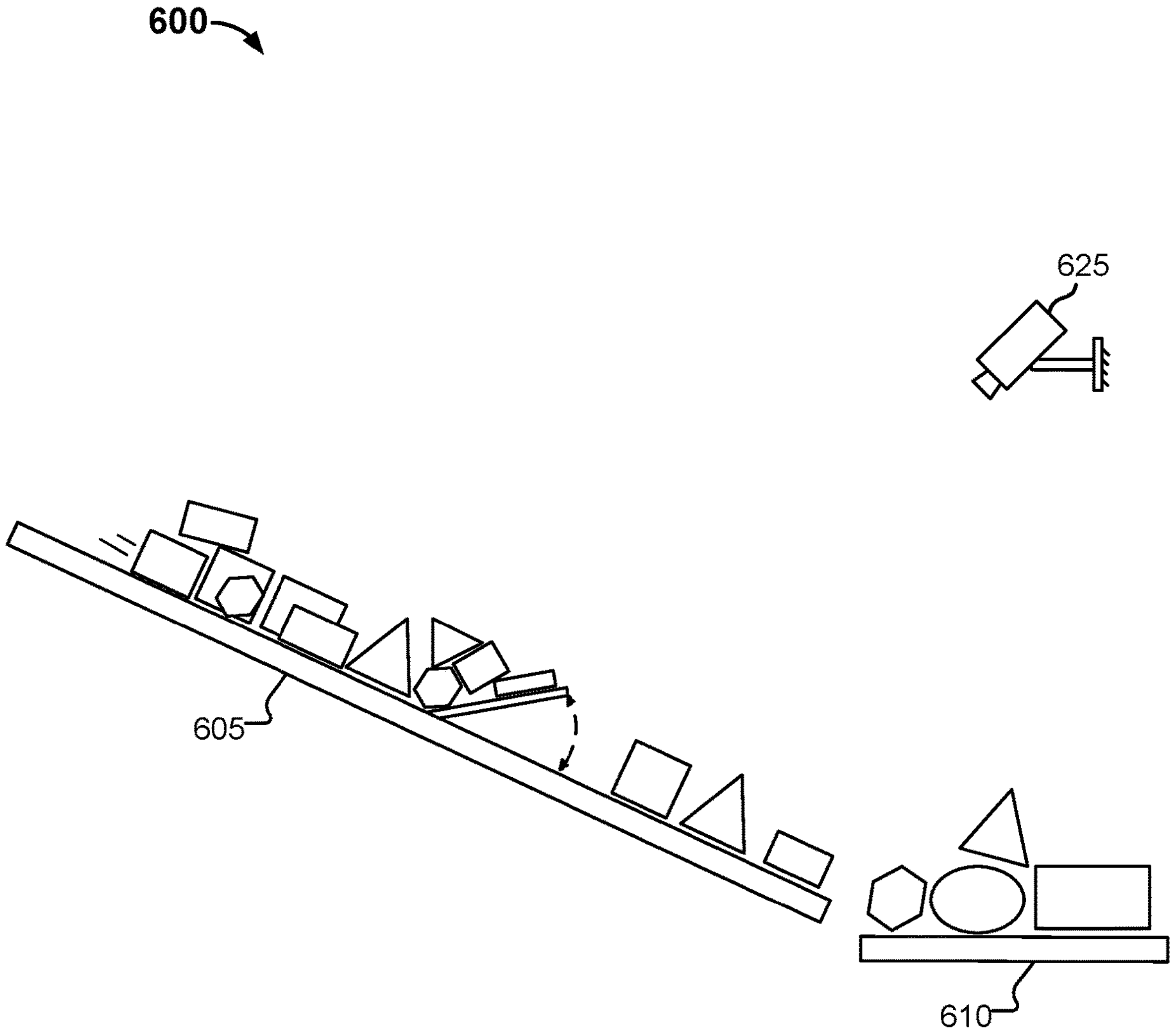
FIG. 6B is a side view of an example of an infeed gating system according to various embodiments.

FIG. 6B is a side view of an example of an infeed gating system according to various embodiments. In the example illustrated in FIG. 6B, system 600 may control/regulate the flow of items from chute 605 to workspace 610.

According to various embodiments, system 600 may control the gating element(s) to singly distribute items on the chute (e.g., into cause items to be singly provided to the workspace 610). System 600 may control a pitch of the gating element(s) in a manner to cause the items to be so singly distributed. For example, as illustrated in FIG. 6B, upstream of the gating element(s), several items are densely distributed on chute 605. The densely distributed items upstream of the gating element(s) may have items overlapping one another, items piled on each other, etc. However, downstream of the gating elements, the items are carried down the chute in a less densely distributed manner (e.g., the distribution of the items may be such that the items are singly placed on the chute, or are singly provided to the workspace, etc.).

According to various embodiments, the flow of the items on chute 605 may be controlled based on raising the gating element(s) (e.g., a flapper) such as by increasing a pitch of the gating element(s). In the unimpeded state, the gating element(s) may be substantially flush with chute 605, and when system 600 is controlling the flow based on actuation of the gating element(s), the gating element(s) is raised in a manner that at least part of the gating element(s) is no longer flush with the surface of the chute on which items flow.

The flow of items on the chute 605 may be controlled to cause a waterfall of items that flow over an edge of the gating element(s) (e.g., within the particular flow channel associated with the particular gating element). For example, the waterfall of items may be controlled so that items are singly distributed on a part of chute 605 downstream from the gating element(s) (e.g., to singly convey/provide the items to workspace 610). The singly distributed items may make grasping of the corresponding items (e.g., by a robot) easier in the workspace/pickup area. In some embodiments, the gating element(s) is actuated to move the gating element(s) up and down (e.g., to vary a pitch of the gating element(s) such as cycling from a relatively low pitch of the gating element(s) to a relatively high pitch of the gating element(s), etc.). The gating element(s) may be cycled up/down to effectively shake the items onto a downstream segment of the chute, such as in a manner that items are one-by-one distributed to the downstream segment, or otherwise at a rate that cause a one-layer distribution of items at the downstream segment (e.g., to prevent items from overlapping or otherwise resting on one another).

Figure 7A:
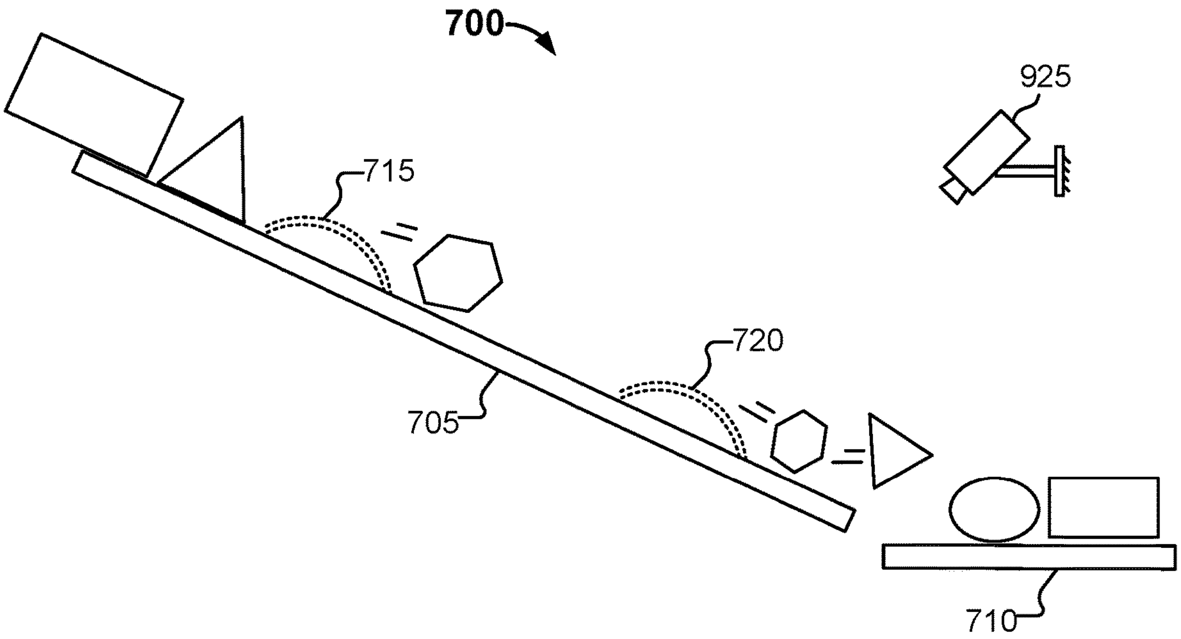
FIG. 7A is a side view of an example of an infeed gating system according to various embodiments.
Figure 7B:
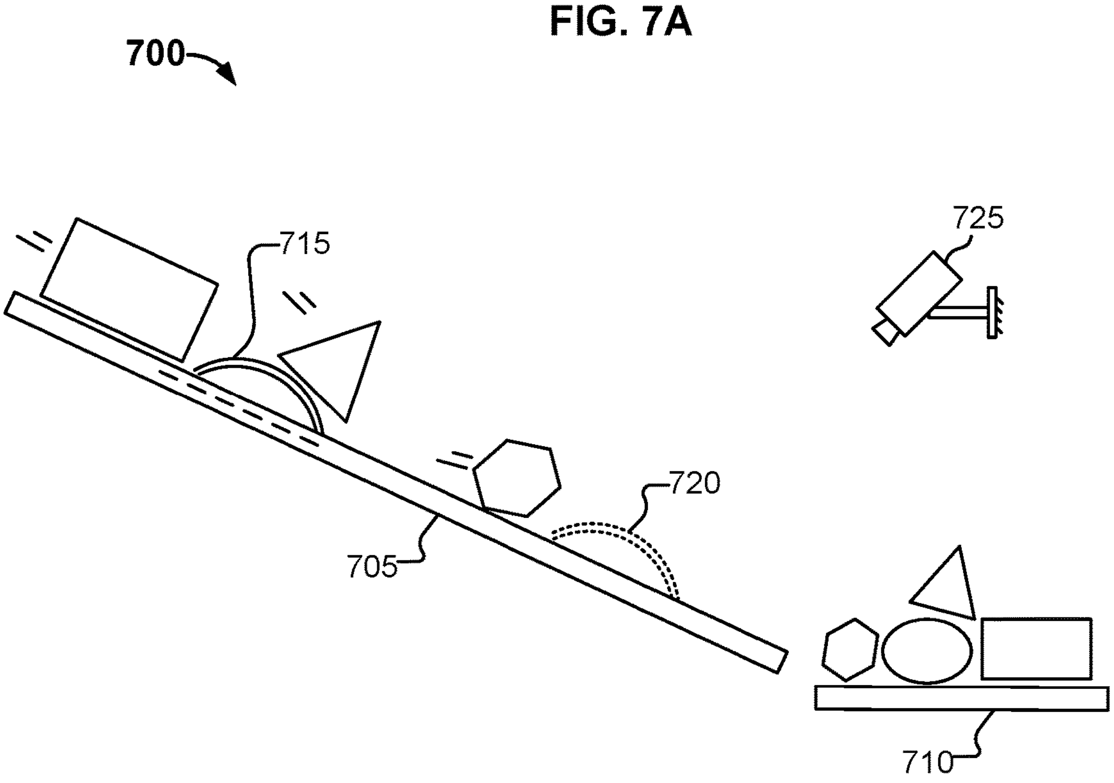
FIG. 7B is a side view of an example of an infeed gating system according to various embodiments.

FIG. 7A is a side view of an example of an infeed gating system according to various embodiments. FIG. 7B is a side view of an example of an infeed gating system according to various embodiments. According to various embodiments, system 700 (e.g., an infeed gating system) comprises a gating structure that includes a plurality of gating elements that are controlled to regulate the flow of items through a plurality of flow channels of a chute or other conveyance structure. Each of the plurality of gating elements may correspond to a particular flow channel. For example, each gating element may correspond to a different flow channel. As another example, subsets of one or more gating elements are associated with a particular flow channel such that a first subset of gating element(s) is associated with a first flow channel, and a second subset of gating element(s) is associated with a second flow channel. Because the example is shown as a side view, system 700 is described in connection with regulating/controlling the flow of items in a particular flow channel (e.g., by controlling one or more associated gating elements). However, system 700 may be extended to one or more other flow channels of the chute or other conveyance structure.

In the examples illustrated in FIG. 7A and FIG. 7B, system 700 comprises a chute 705 that provides items to a workspace 710 (e.g., the pick area), and one or more sensors such as camera 725. System 700 may comprise various sensors including one or more of a camera, an infrared sensor array, a laser array, a scale, a gyroscope, a current sensor, a voltage sensor, a power sensor, a force sensor, a pressure sensor, a weight sensor, and the like. According to various embodiments, system 700 may control/regulate flow of items from chute 705 to workspace 710. System 700 may control/regulate flow of the items based at least in part on sensor data (e.g., information obtained by the one or more sensors). System 700 may control the flow of the items from chute 705 to workspace 710 based on a control of the disrupter device. As illustrated in FIG. 7A, the disrupter device may be controlled to vary an orientation/position of a gating element(s). The gating element(s) may be a bladder or other such structure that may be integrated into the surface of chute 705.

In various embodiments, the system may comprise a plurality of gating element(s). In some implementations, a single gating structure controls a single gating element(s), and in other implementations, a single gating structure may control a plurality of gating element(s). As illustrated in FIG. 7A, system 700 may comprise gating element(s) 715 and/or gating element(s) 720. Additional gating element(s) may be implemented. Gating element(s) 715 and gating element(s) 720 may be bladders that may be respectively integrated with chute 705.

In some embodiments, flow in a chute is regulated by system 700 via robotic control of a series of bladders positioned in (e.g., integrated with) the chute 705. System 700 regulates flow in a plurality of flow channels using the set of bladders. One or more of the series of bladders are inflated and deflated, as sensed conditions indicate. The inflating/deflating of the series of bladders may create a reduced slope in some areas and an increased slope in other areas. The varying of the slopes of the series of bladders (e.g., of the chute), or parts of bladders, controls the flow of items such as reducing, increasing, or unjamming the flow of items within the chute, as needed.

According to various embodiments, the system dynamically controls the flow of items based on sensed conditions. For example, the system obtains the sensor data and dynamically determines whether to (and how to) control the flow of items in a flow channel at the chute. In response to the system determining to control the flow of items in a flow channel at the chute, the system may implement a determined control (e.g., based on a determined plan to control the flow of items), and the system may monitor a state of the workspace and/or items within the workspace and determine whether to (and how to) update the control of the flow of items, and the system may implement the update. The system may iteratively and/or continuously update the control of the flow of items based at least in part on the sensor data (e.g., a state of the workspace). The system may additionally, or alternatively, control the flow of items based at least in part on sensor data associated with the chute and/or items within the chute.

According to various embodiments, system 700 uses sensor feedback (e.g., updated monitoring of the sensor data and/or state of the workspace) in connection with controlling the flow of items. As an example, system 700 controls the flow of items/adjust the control of the flow of items based at least in part on items within the workspace and/or chute (e.g., a type of item, a weight of the item, a rigidity of the item, a type of packing, an indication of whether the item is fragile, etc.), a flow volume, a flow velocity, a flow rate, a burden depth, etc. The items within the workspace and/or chute (e.g., a type of item, a weight of the item, a rigidity of the item, a type of packing, an indication of whether the item is fragile, etc.), a flow volume, a flow velocity, a flow rate, a burden depth, etc. may be determined based on a computer vision (e.g., based on image data captured by a camera), and/or other sensor data.

As illustrated in FIG. 7A, gating element(s) 715 and gating element(s) are illustrated hashed lines, which denote that the bladders are deflated and at least substantially level with chute 705. However, as illustrated in FIG. 7B, gating element(s) is illustrated with a solid line, which denotes that the corresponding bladder is inflated. The flow of items is correspondingly impeded by gating element(s) 715. System 700 may determine to inflate the bladder corresponding to gating element(s) 715 in response determining that the workspace 710, or items within workspace 710, satisfies flow regulation condition. For example, as illustrated in FIG. 7A and FIG. 7B, the workspace 710 of FIG. 7B is denser, has a greater number of items, has less room available for additional items, and is less stable because of the burden depth (e.g., the triangle item stacked on the oval item).

According to various embodiments, system 700 may control the gating element(s) to be oriented at a particular configuration (e.g., inflated, deflated, or an extent in which the bladder is inflated) based on an extent or type of control/regulation to be implemented. System 700 may store a mapping of configurations of the gating element(s) to an extent or type of control/regulation of the flow of items. For example, various configurations (e.g., various degrees of inflation) may be mapped to various speeds of the flow or profiles of the flow (e.g., permitting items to singly flow over the gating element(s), causing the flow to be distributed as a single layer of item(s) such as without overlap or piling of items, etc.). As another example, a configuration of the gating element(s) may be mapped to a halting the flow of items such as if the gating element(s) is positioned to be perpendicular to the surface of the inflated completely or beyond a threshold inflation value, or if the angle of the gating element(s) is too steep for an item to flow up/over the gating element(s).

System 700 may further comprise a robotic arm (not shown) that moves the items from the workspace 710 to a destination location. In the context of a system that singulates items from the workspace 710, the destination location may be a segmented conveyor or a tray on a conveyor, etc. In the context of a system that kits items from workspace 710, the items on the workspace 710 may be further routed/conveyed to a kitting shelf system such as to a feeder portion to a kitting shelf system. In the context of a system that palletizes the items, the destination location may be a pallet (e.g., the workspace 710 may be an area from which the robotic arm picks the items, or the workspace 710 may be a conveyor that further conveys the items to within range of the robotic arm).

In various embodiments, system 700 may control the disrupter device based at least in part data associated with a plurality within the workspace 710 and update the control to the disrupter device based on updated information or feedback from one or more sensors. The data associated with a plurality within the workspace 710 may correspond to, or be obtained based on, sensor data. The sensor data may be obtained based at least in part on information obtained by one or more sensors in system 700 such as a sensor(s) within proximity of workspace 710 (e.g., camera 725). In some embodiments, system 700 determines (e.g., generates) a model of the workspace, including a model of the plurality of items within workspace 710. The model may include information pertaining to one or more items within the workspace 710, information pertaining to the robotic arm, etc. The information pertaining to one or more items may include one or more attributes of at least one item (e.g., a size, shape, identifier, barcode, expected weight, expected center of gravity, type of packaging, etc.), a position of at least one item (e.g., a position relative to the workspace, a position relative to another item(s), etc.), a boundary or edge of at least one item, etc. System 700 may determine a characteristic/property associated with an item in the workspace 710, a set of items in the workspace 710, and/or a pile of items in the workspace 710. For example, system 700 may determine one or more of a density of items on at least part of workspace 710, a depth of items on at least part of the workspace 710 (e.g., an indication of whether an item is on top of another item, or whether an item at least partially occludes another item on the workspace, etc.), a stability of a set of items on the workspace (e.g., a stability of a pile of items in the workspace), a spacing between a set of items, an amount of empty space or space available for a further item(s), an expected number of items that may be added to the workspace before a threshold associated with the workspace (e.g., a threshold associated with one or more of the foregoing characteristics of the workspace and/or item(s) in the workspace), etc. System 700 may store one or more predefined thresholds associated with a characteristic/property associated with the workspace 710, an item in the workspace 710, a set of items in the workspace 710, and/or a pile of items in the workspace 710. For example, system 700 may store one or more predefined thresholds respectively associated with the foregoing characteristics/properties (e.g., density, spacing, and/or quantity of items, space available for further items, expected further/additional items that may be introduced to the workspace, etc.).

Figure 8A:
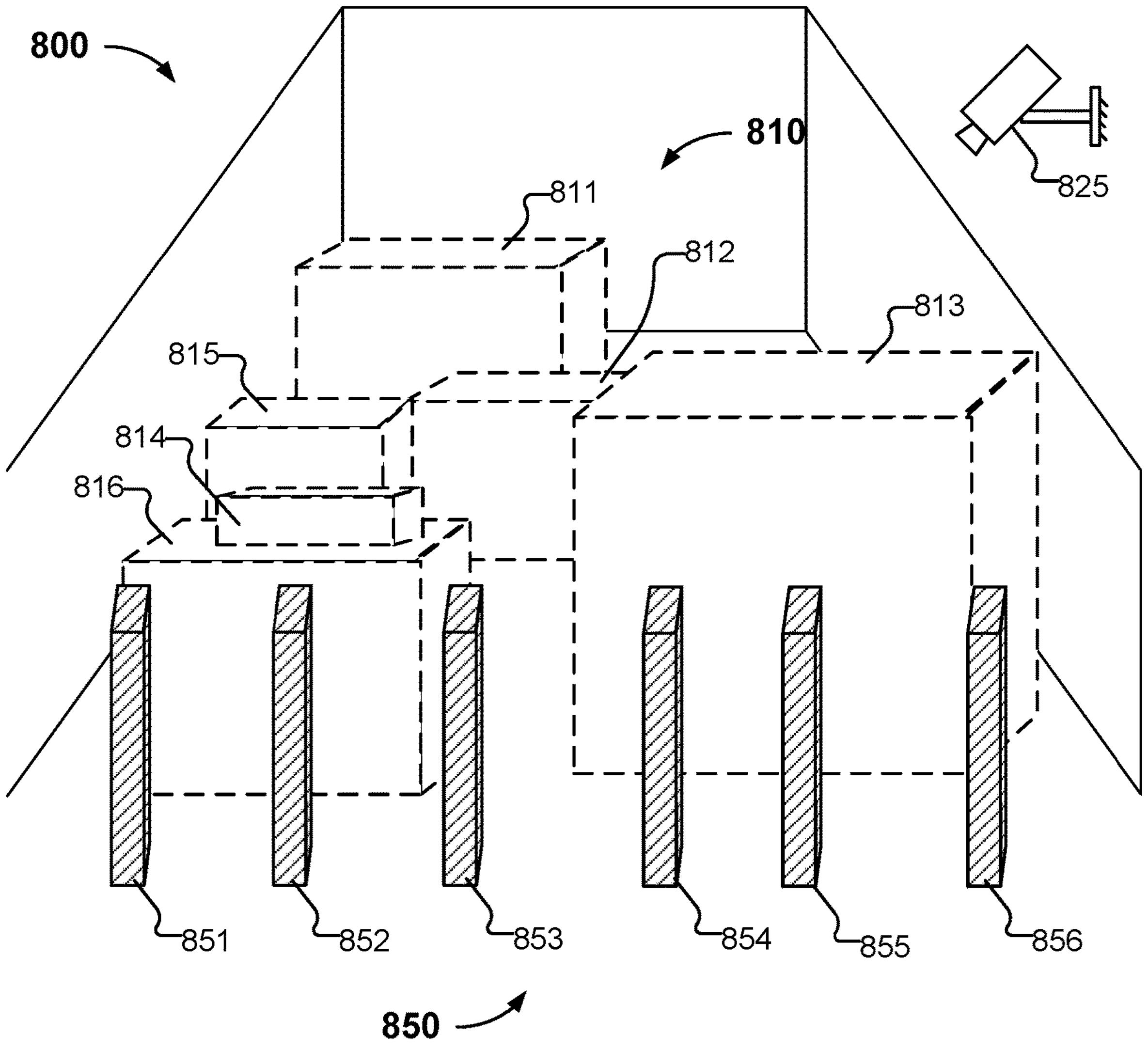
FIG. 8A is an example of an infeed gating system according to various embodiments.

FIG. 8A is an example of an infeed gating system according to various embodiments. In the example shown, infeed gating system 800 comprises gating structure 850. In some embodiments, gating structure 850 comprises gating elements 851-856. Although infeed gating system 800 is illustrates gating elements 851-856 as bollards (e.g., rectangular pillars), various other types of gating elements may be implemented.

As illustrated in FIG. 8A, gating elements 851-856 are configured in a closed position. Accordingly, gating elements 851 restrict items 811-814 from flowing from input source 810 (e.g., an upper chute component).

In some embodiments, infeed gating system 800 (e.g., a control computer) controls gating structure 850 (e.g., configuration of gating elements 851-856) based at least in part on sensor data, such as sensor output obtained from sensors in the workspace of infeed gating system 800, such as camera 825. Gating elements 851-856 may be controlled individually/independently, or various subsets of gating elements may be controlled collectively while independent of another subset of gating elements. For example, infeed gating system 800 selectively controls gating elements 851-856 to control/regulate the flow of items from the input source 810 to the pick area. In some embodiments, infeed gating system 800 controls gating structure 850 based at least in part on model of flow from input source 810 to the pick area (e.g., flow through the chute), a set of items in the pick area (e.g., a density of item in the pick area, a number of items in the pick area, a distribution of items in the pick area, a pile depth of items in the pick area, etc.), and a state of gating structure 850. For example, infeed gating system 800 determines a model(s) for one or more of a flow of items, a state of a pick area, a state of gating structure 850, etc.

Figure 8B:
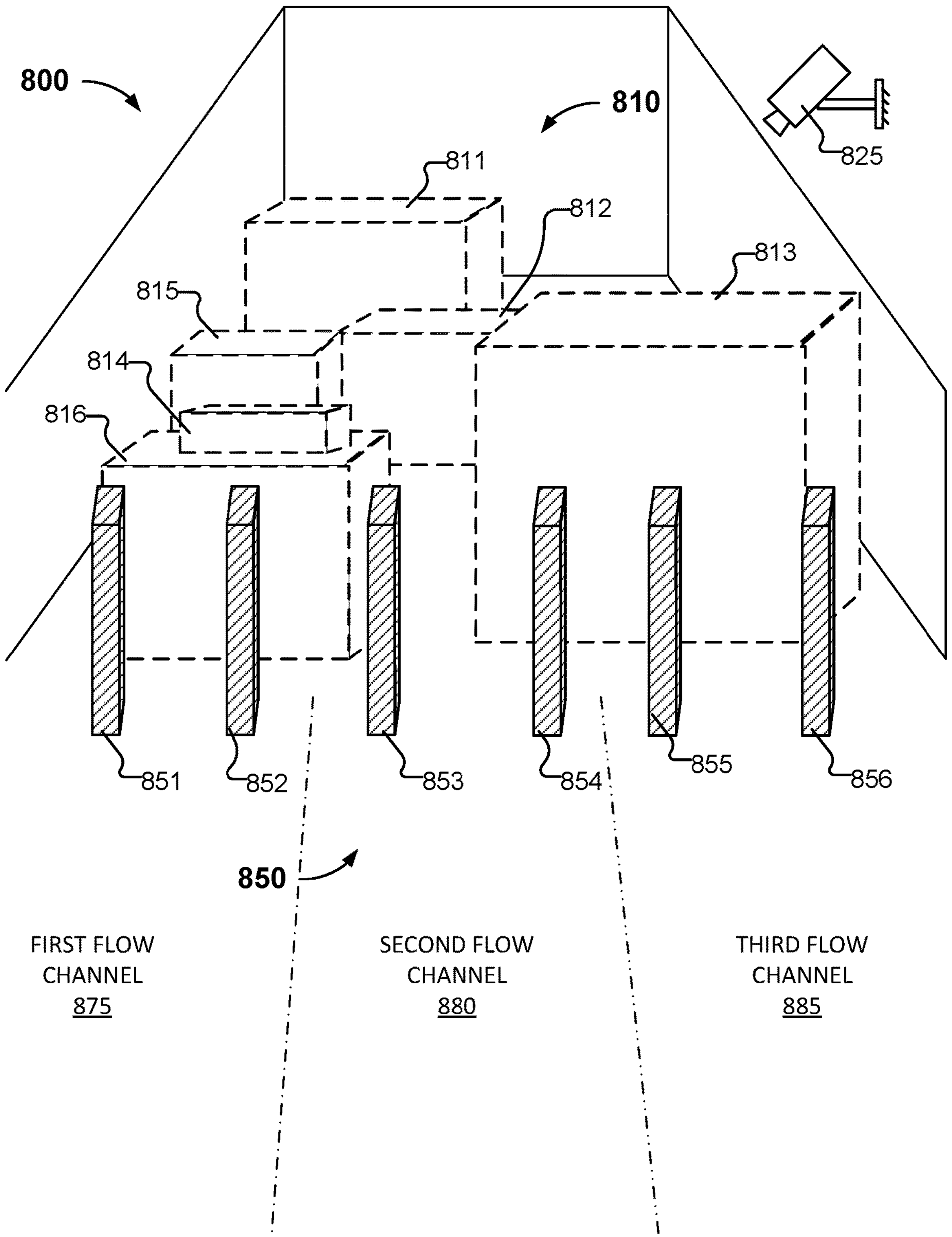
FIG. 8B is an example of an infeed gating system according to various embodiments.

FIG. 8B is an example of an infeed gating system according to various embodiments. In the example shown, infeed gating system 800 comprises a plurality of flow channels, such as first flow channel 875, second flow channel 880, and third flow channel 885. The plurality of flow channels may be a logical construct in the model for the flow of items in the chute or other conveyance structure for delivering items from input source 810 to the pick area.

In some embodiments, infeed gating system 800 independently controls flow of items in the plurality of flow channels. For example, infeed gating system 800 controls gating structure 850 in connection with controlling flow of items in first flow channel 875 independent of second flow channel 880. Infeed gating system 800 may update the number of flow channels (e.g., increase the number of flow channels or decrease the number of flow channels), such as based on a state of the chute or other conveyance structure, state of gating structure 850, state of the flow of items, one or more characteristics of items to be delivered to the pick area (e.g., a queue of items in a first/upper component of the chute, a queue of items at the input source, etc.).

In some embodiments, the system comprises a plurality of robotic arms in proximity to the pick area in order to pick items. As an example, each flow channel may have an associated robotic arm to process items delivered to a corresponding part of the pick area. For example, first flow channel 875 may deliver items to a first pick area, and the system may comprise a first robotic arm to pick items from the first pick area; second flow channel 880 may deliver items to a second pick area, and the system may comprise a second robotic arm to pick items from the second pick area; and third flow channel 885 may deliver items to a third pick area, and the system may comprise a third robotic arm to pick items from the third pick area. In some embodiments, the system comprises a plurality of robotic arms that are associated with a corresponding flow channel on a one robotic arm to one flow channel basis. In some embodiments, the plurality of robotic arms is associated with a corresponding channel on a one robotic arm to at least one flow channel basis (e.g., a robot may be associated with a plurality of flow channels).

Figure 8C:
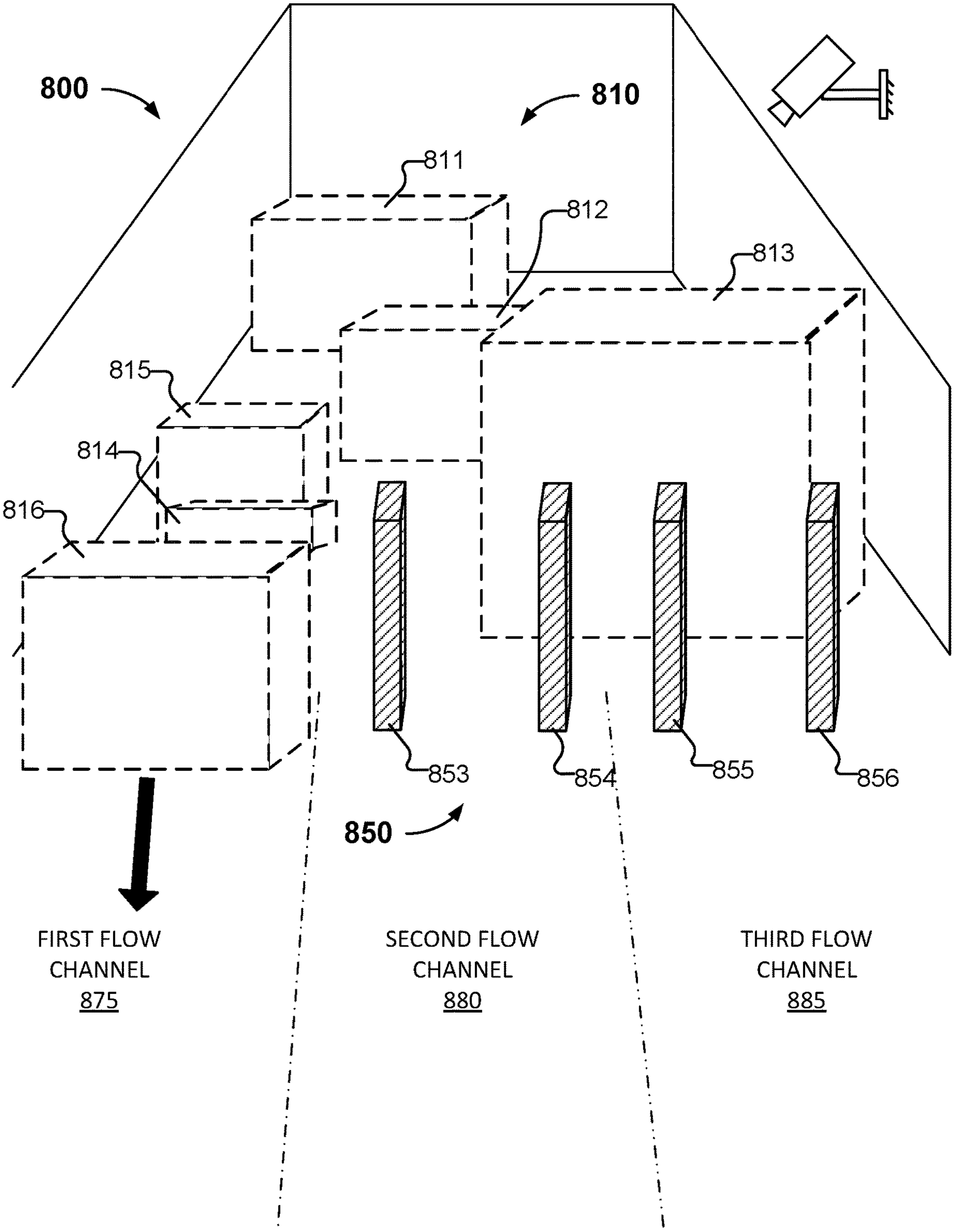
FIG. 8C is an example of an infeed gating system according to various embodiments.

FIG. 8C is an example of an infeed gating system according to various embodiments. In the example shown, infeed gating system 800 selectively controls the gating elements 851-852 to permit the flow of items in first flow channel 875. For example, infeed gating system 800 controls gating structure 850 to configure gating elements 851-852 to an open position (e.g., flush or recessed in relation to the chute bottom surface). As another example, infeed gating system

800 controls gating structure 850 to maintain/configure gating elements 853-856, such as to restrict the flow of items in second flow channel 880 and third flow channel 885.

As illustrated in FIG. 8C, gating elements 851-852 are configured in an open position/state and thus item 816 passes the gate and flows to the pick area via first flow channel 875. However, because gating elements 853-856 are maintained in the closed position/state, items 812 and 813 are restricted from passing the gate to flow down second flow channel 880 or third flow channel 885.

Figure 8D:
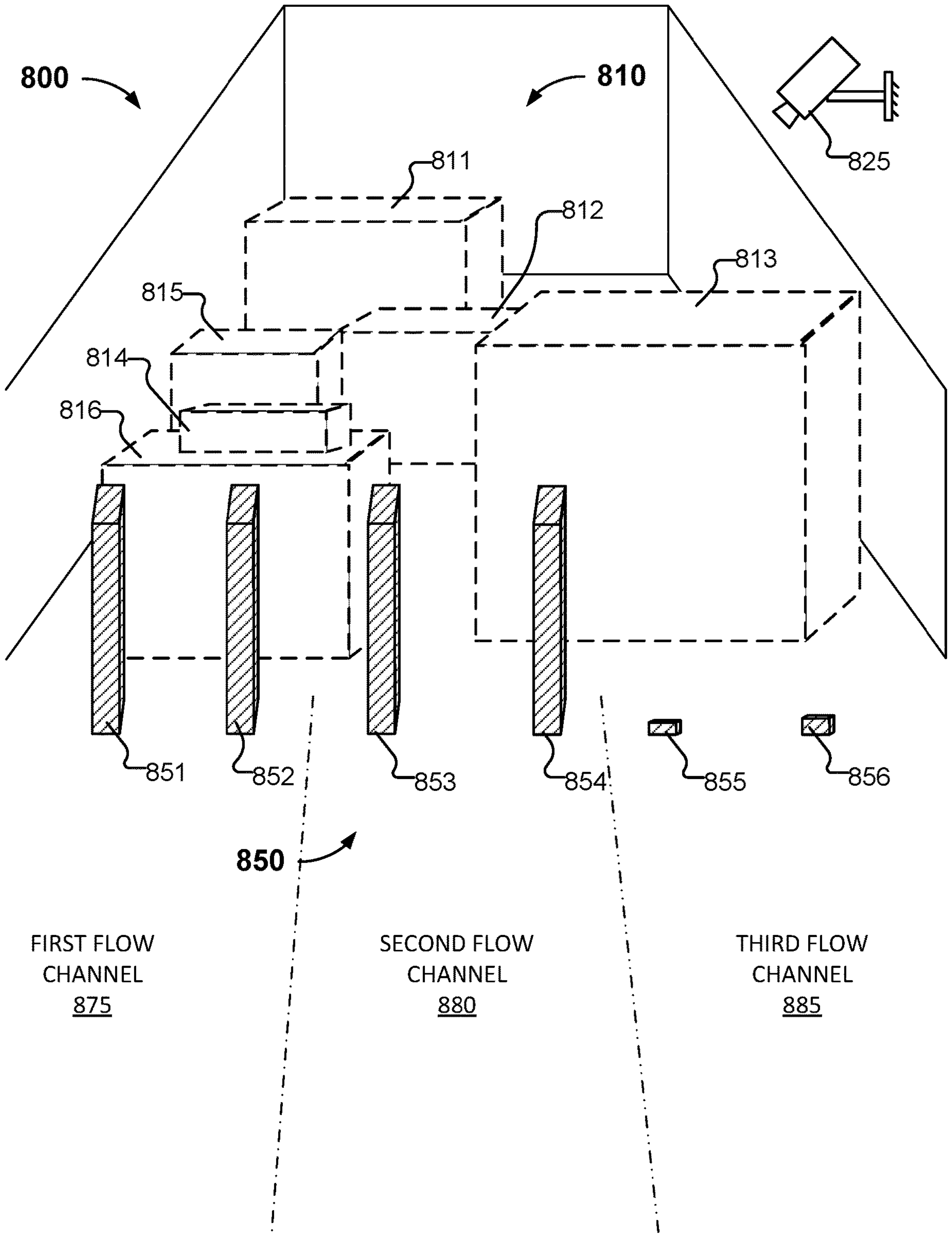
FIG. 8D is an example of an infeed gating system according to various embodiments.

FIG. 8D is an example of an infeed gating system according to various embodiments. In contrast to FIG. 8C, in the example shown in FIG. 8D, infeed gating system 800 selectively controls the gating elements 855-856 to permit the flow of items in third flow channel 885. For example, infeed gating system 800 controls gating structure 850 to configure gating elements 855-856 in an open position or a semi-open position.

Gating structure 850 may be configured in a manner that the gating elements, when configured in an open position, are flush or recessed in relation to the bottom side of the chute or other conveyance structure via which the items flow from the input source to the pick area. In some embodiments, gating structure 850 is configured in a manner that the gating elements, when configured in an open position, extend (e.g., product) from the bottom surface of chute or other conveyance structure by a certain distance (e.g., a distance sufficiently small to not restrict items from flowing through the gate formed by the gating elements).

As illustrated in FIG. 8D, even though gating elements 855-856 are configured in an open state, item 813 is wider than third flow channel 885 and thus is unable to pass through gating structure 850 to be delivered to the pick area. In some embodiments, infeed gating system 800 detects that item 813 is unable to pass through gating structure 850, such as based on sensor data. For example, infeed gating system 800 generates a model of the input source, gating structure 850, chute or other conveyance structure, and/or the pick area. Infeed gating system 800 determines, based at least in part on the model(s), that item 813 is still restricted from passing through gating structure 850.

Figure 8E:
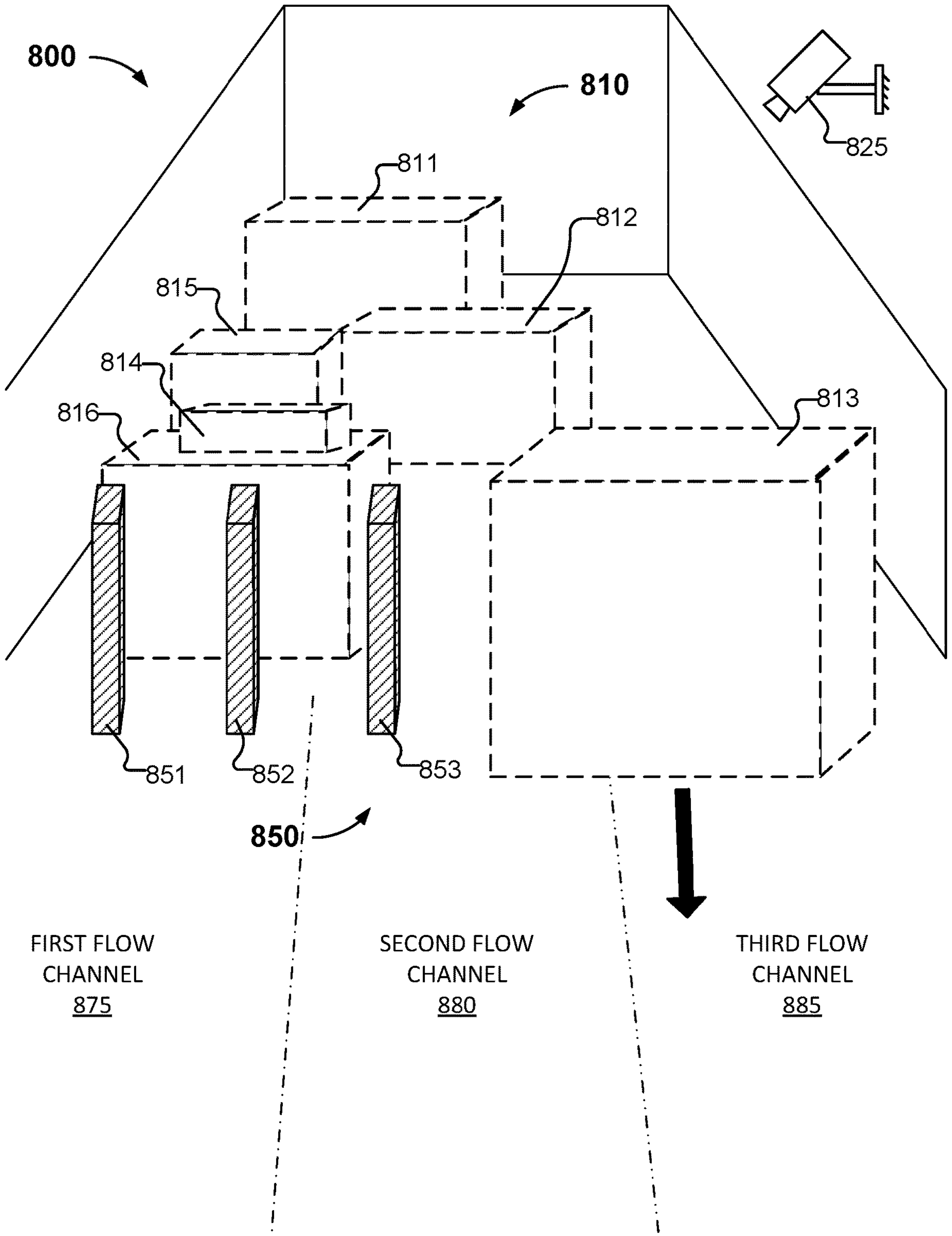
FIG. 8E is an example of an infeed gating system according to various embodiments.

FIG. 8E is an example of an infeed gating system according to various embodiments. In the example shown, infeed gating system 800 controls gating structure 850 to configure gating elements 854-856 to an open position. When gating elements 854-856 are moved to an open position, item 813 is free to flow to the pick area.

Because item 813 is wider than third flow channel 885, infeed gating system 800 combines at least part of second flow channel 880 with third flow channel 885. For example, infeed gating system 800 logically creates a new flow channel via which item 813 is to flow to the pick area and infeed gating system 800 correspondingly controls the gating elements associated with the new flow channel (e.g., gating elements 854-856). Accordingly, infeed gating system 800 can determine flow channels and subsets of gating elements associated with the flow channels based at least in part on the items queued at gating structure or that are expected to arrive at the gating structure from the input source, etc.

Figure 9A:
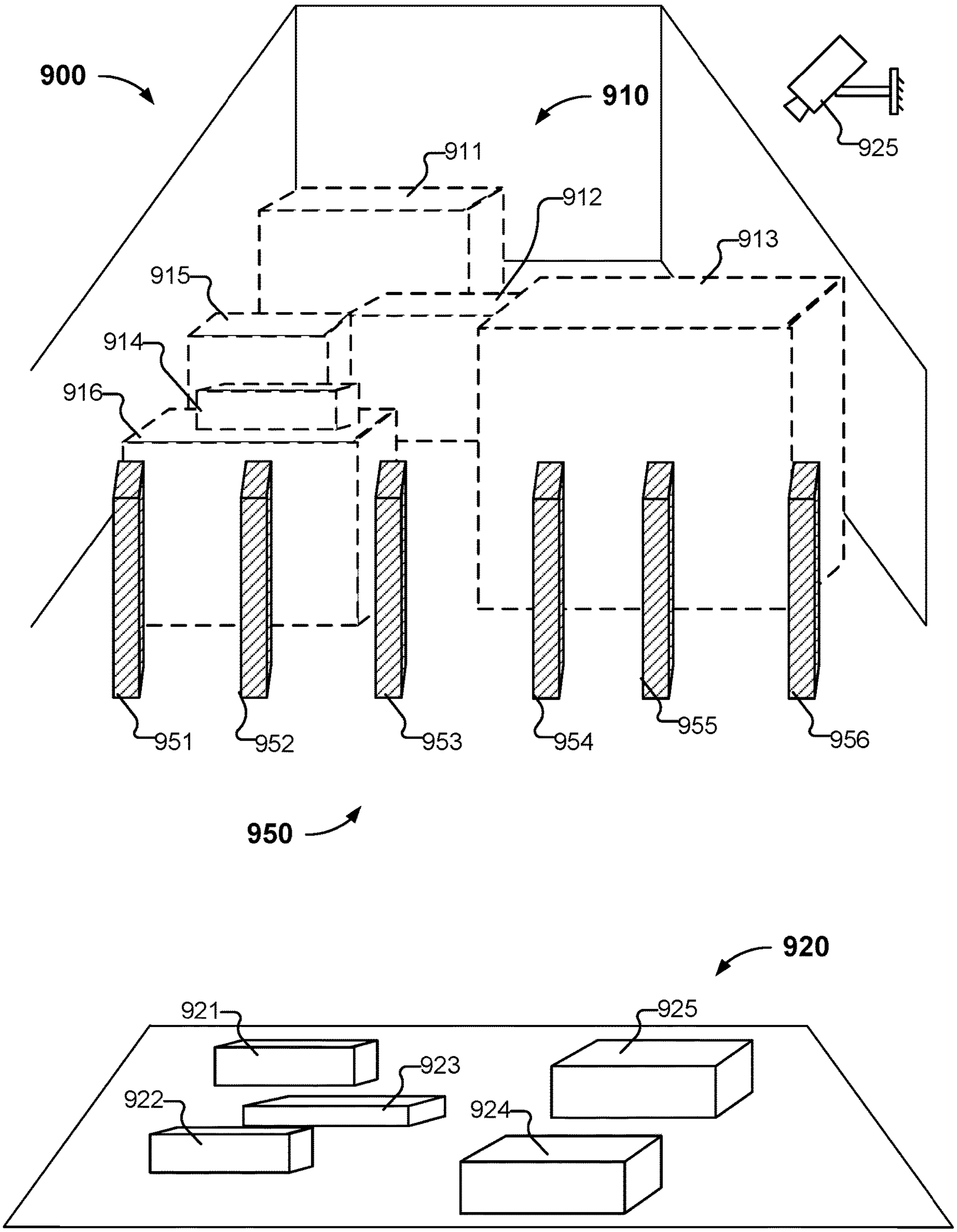
FIG. 9A is an example of a workspace comprising a pick area and an infeed gating structure according to various embodiments.

FIG. 9A is an example of a workspace comprising a pick area and an infeed gating structure according to various embodiments. In the example shown, infeed gating system 900 regulates the flow of items from input source 910 to pick area 920 or regulates characteristics of the set of items at pick area 920 (e.g., item density, item distribution, item volume, pile depth of items, etc.).

Infeed gating system 900 comprises one or more sensors, such as sensor 925 (e.g., a camera). The one or more sensors obtain information pertaining to the workspace, such as a state of input source 910, a state of pick area 920, and/or a state of gating structure 950 (e.g., an indication of the configuration of various gating elements, the item flow or item queue at gating structure 950, etc.). In response to obtaining the sensor data output from the one or more sensors, infeed gating system 900 generates a model of the workspace and controls/regulates the flow of items from input source 910 to pick area 920.

In some embodiments, the model of the workspace includes information pertaining to items that flowing from input source 910 (e.g., items 911, 912, and 915) to gating structure 950 or information pertaining to items queued at gating structure 950 (e.g., items 913, 914, 916). For example, the model includes information pertaining to attributes of the items, such as size, dimensions (e.g., width), shape, identifier, type, fragility, rigidity, etc.

In some embodiments, the model of the workspace includes information pertaining to items in pick area 920 (e.g., items 921-925). For example, the model includes attributes for items 921-925 and/or characteristics pertaining to the set of items in pick area 920, such as density of items 921-925, number of items, distribution of items 921-925, a pile depth of items in pick area 920, etc. Various other characteristics may be determined based on the sensor data and used to obtain the model.

As an example, the generating the model of the workspace includes obtaining sensor output, segmenting the sensor output (e.g., a picture captured by the camera), detecting the objects in the workspace (e.g., the items, gating elements 951-956), etc.

Figure 9B:
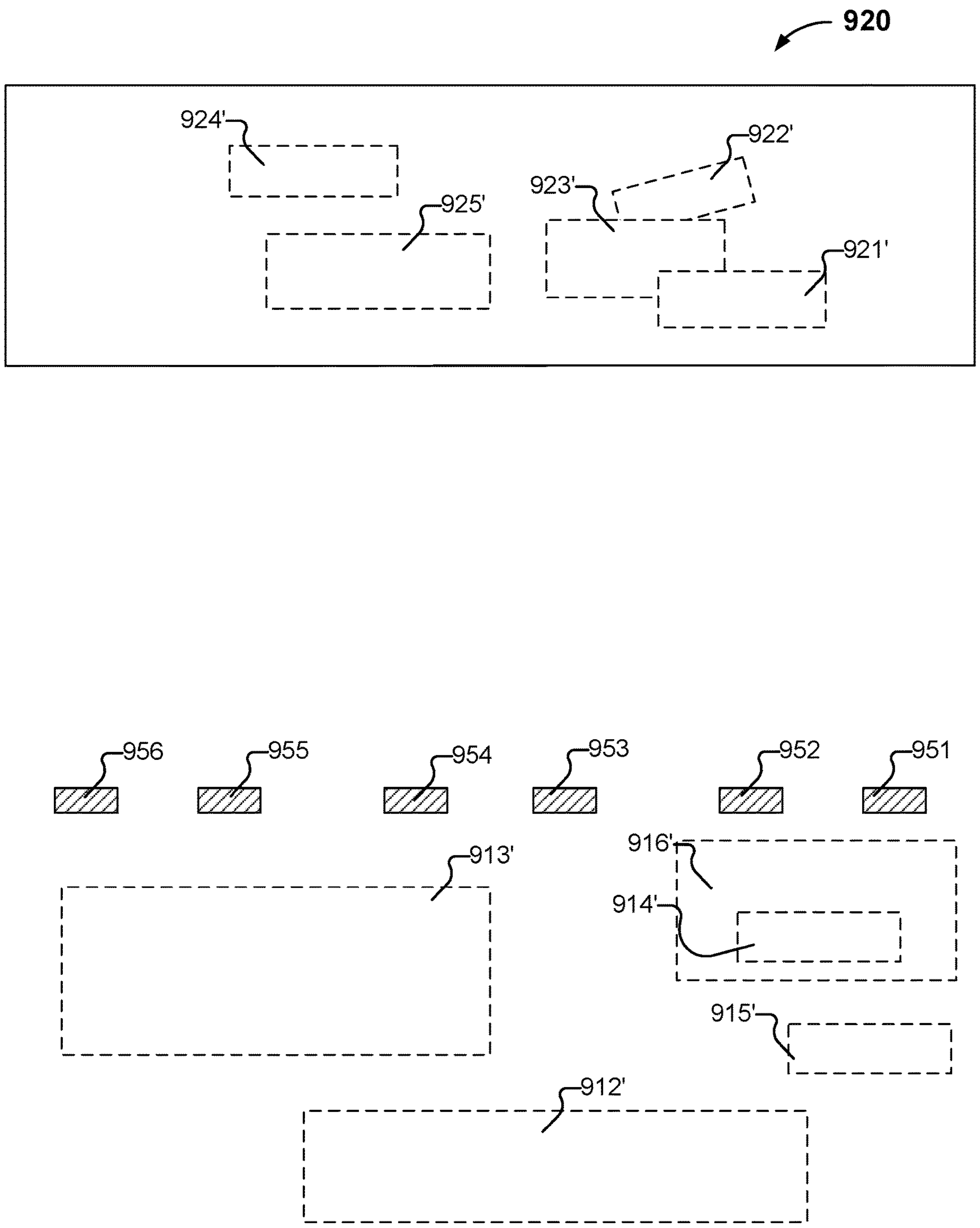
FIG. 9B is an example of a segmentation result of a workspace comprising a pick area and an infeed gating structure according to various embodiments.

FIG. 9B is an example of a segmentation result of a workspace comprising a pick area and an infeed gating structure according to various embodiments. Infeed gating system 900 analyzes sensor data from the one or more sensors, detects the objects in the workspace, and generates a model. As an example, FIG. 9B illustrates a model of the workspace, such as from a perspective of sensor 925.

Infeed gating system 900 analyzes the sensor data pertaining to a state of pick area 920. For example, infeed gating system 900 segments an image of pick area 920 and detects items comprised in pick area 920 (e.g., representations of items 921', 922', 923', 924', and 925'). Infeed gating system 900 can use the information pertaining to items 921', 922', 923', 924', and 925' in connection with generating the model.

Infeed gating system 900 analyzes the sensor data pertaining to a state of the input source, the flow of items from the input source, or a queue of items at gating structure 950. As an example, infeed gating system 900 segments an image of the input source, the flow of items from input source 910 to gating structure 950, and/or an image of gating structure 950. Infeed gating system 900 can use the segmentation result to detect the items (e.g., representations of items 912', 913', 914', 915', and 916') and/or attributes pertaining to the items.

Infeed gating system 900 can have prior knowledge of the various components of infeed gating system, such as the walls or boundaries of the chute or other conveyor structure from input source 910 to pick area 920, or the location of gating elements 951-956. Alternatively, or additionally, infeed gating system 900 uses the sensor data to detect gating elements 951-956 and/or to determine a states of gating elements 951-956.

According to various embodiments, the system monitors the workspace (e.g., using sensor data obtained by one or more sensors) and generates performance data for picks from the pick area, item flow through the chute or other conveyance structure, the controlling of item flow by the gating structure etc. The system may use the performance data as feedback data that is used to update the model of the workspace, or as training data to update a machine learning model used to model the flow of items and the control of the flow of items based on control of the gating structure. For example, the system may retain memory of successful infeeds (e.g., controlling of the gating element to infeed items to the pick area) or unsuccessful infeeds. The system may use such information in connection with adapting (e.g., updating, retraining, etc.) the machine learning model. The system may use the machine learning model to determine a plan for controlling the gating structure, such as to predict the manner in which the gating elements are to be configured to attain a desired item flow and/or pick area criteria (e.g., the item density satisfies a density threshold, a pile depth satisfies a depth threshold, an item distribution satisfies a distribution threshold, etc.).

Figure 10:
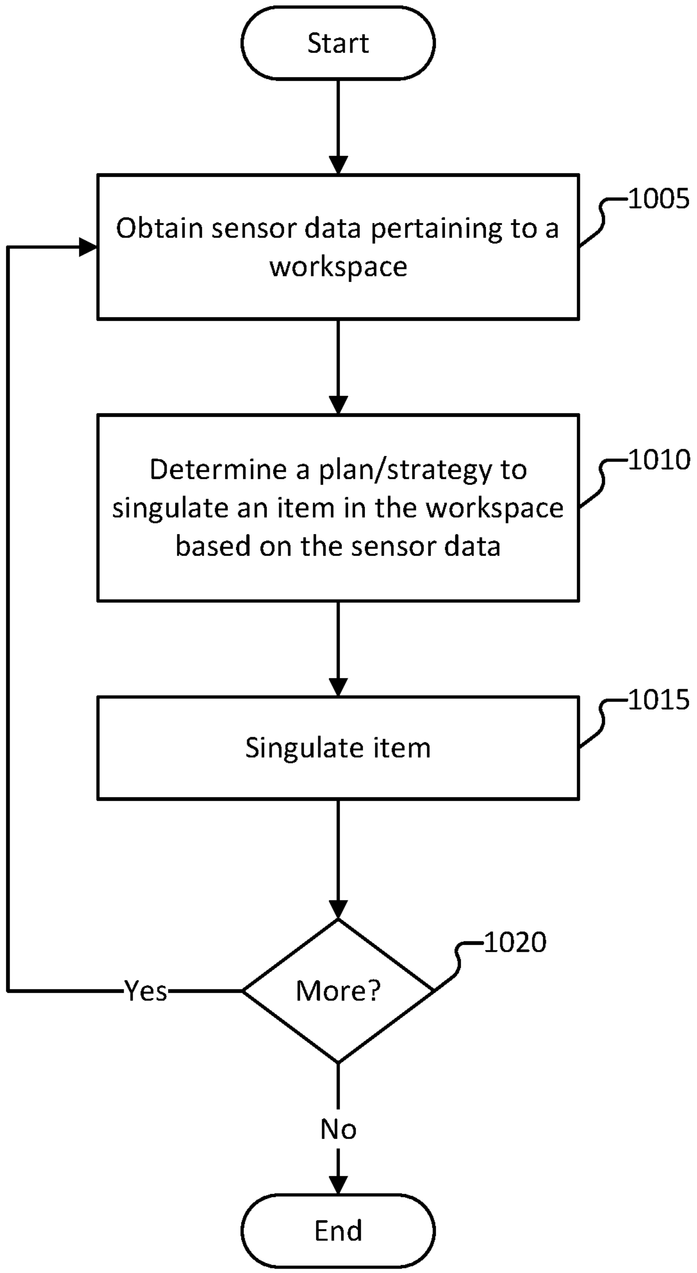
FIG. 10 is a flow diagram of a method for singulating an item according to various embodiments.

FIG. 10 is a flow diagram of a method for singulating an item according to various embodiments. At 1005, sensor data pertaining to a workspace is obtained. At 1010, the system determines a plan/strategy to singulate an item in the workspace based at least in part on the sensor data. At 1015, the item is singulated. At 1020, a determination is made as to whether process 1000 is complete. In some embodiments, process 1000 is determined to be complete in response to a determination that no further models are to be trained, an administrator indicates that process 1000 is to be paused or stopped, etc. In response to a determination that process 1000 is complete, process 1000 ends. In response to a determination that process 1000 is not complete, process 1000 returns to 1005.

Figure 11:
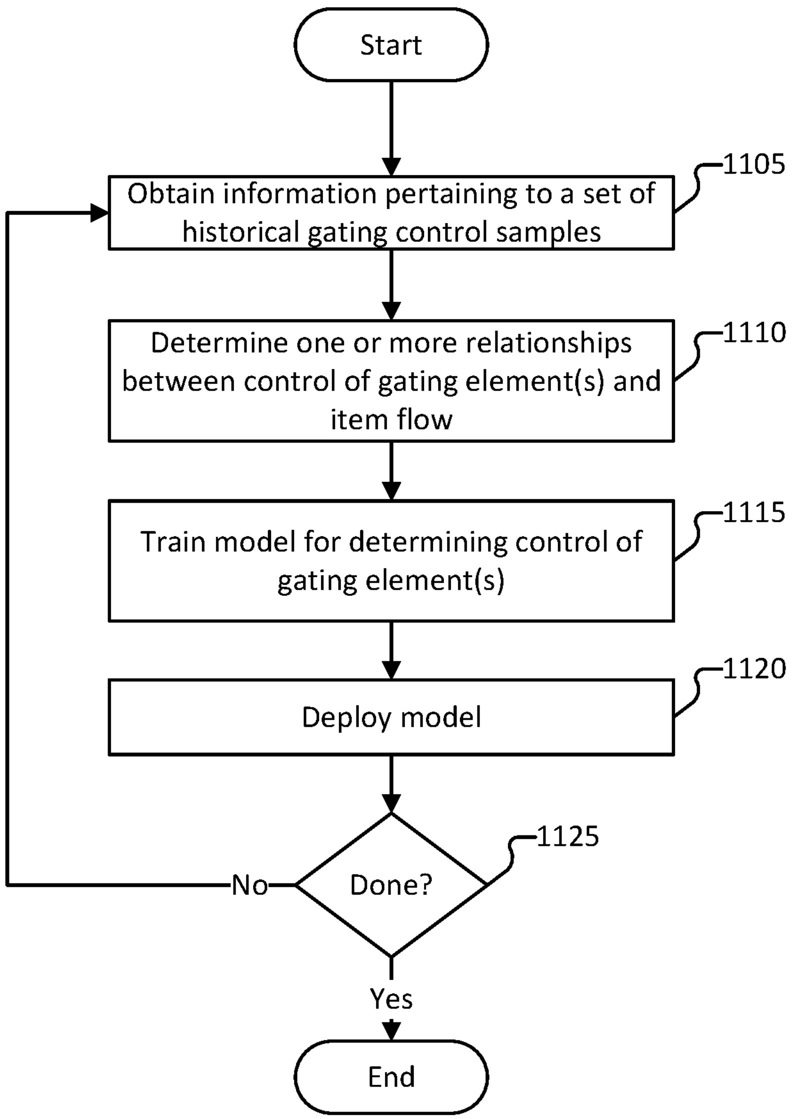
FIG. 11 is a flow diagram of a method for training a model for determining a plan to control a gating structure in connection with mediating a flow of items according to various embodiments.

FIG. 11 is a flow diagram of a method for training a model for determining a plan to control a gating structure in connection with mediating a flow of items according to various embodiments. At 1105, information pertaining to a set of historical gating control samples is obtained. At 1110, the system determines one or more relationships between control of gating elements and item flow. At 1115, a model for determining control of gating element(s) is trained. At 1120, the model is deployed. At 1125, a determination is made as to whether process 1100 is complete. In some embodiments, process 1100 is determined to be complete in response to a determination that no further models are to be trained, an administrator indicates that process 1100 is to be paused or stopped, etc. In response to a determination that process 1100 is complete, process 1100 ends. In response to a determination that process 1100 is not complete, process 1100 returns to 1105.

Figure 12:
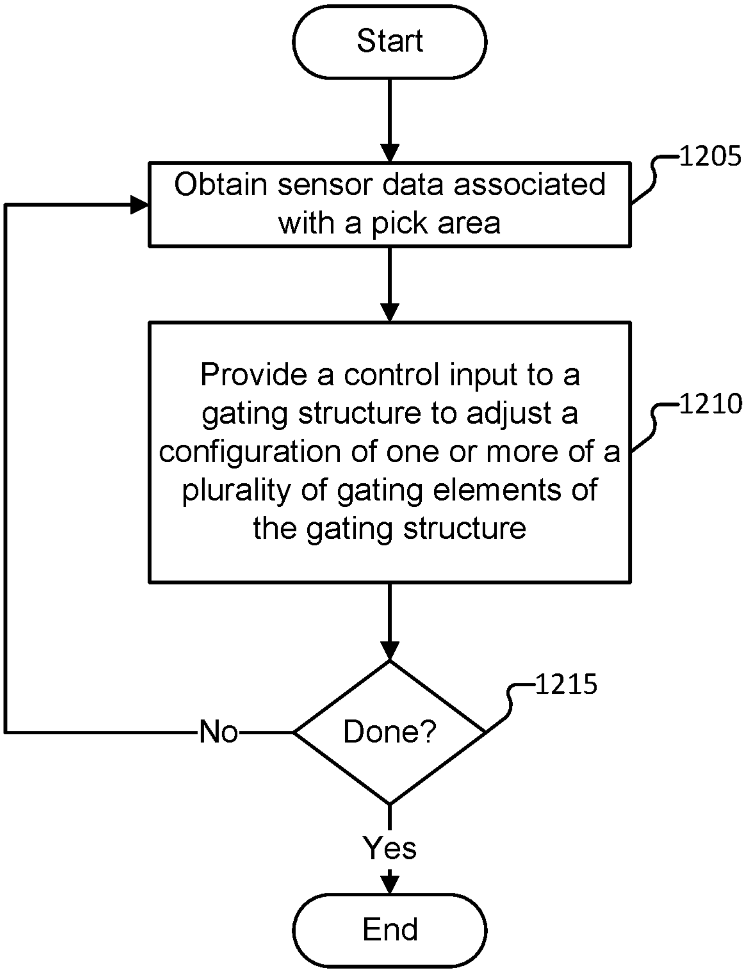
FIG. 12 is a flow diagram of a method for mediating a flow of items from an input source to a pick area according to various embodiments.

FIG. 12 is a flow diagram of a method for mediating a flow of items from an input source to a pick area according to various embodiments. At 1205, the system obtains sensor data associated with a pick area. At 1210, a control input is provided to a gating structure to adjust a configuration of one or more of a plurality of gating elements of the gating structure. At 1215, a determination is made as to whether process 1200 is complete. In some embodiments, process 1200 is determined to be complete in response to a determination that no further gating elements are to be controlled, no further items exist for delivery to the pick area, no further robots are to be controlled to move items from the pick area, an administrator indicates that process 1200 is to be paused or stopped, etc. In response to a determination that process 1200 is complete, process 1200 ends. In response to a determination that process 1200 is not complete, process 1200 returns to 1205.

Figure 13:
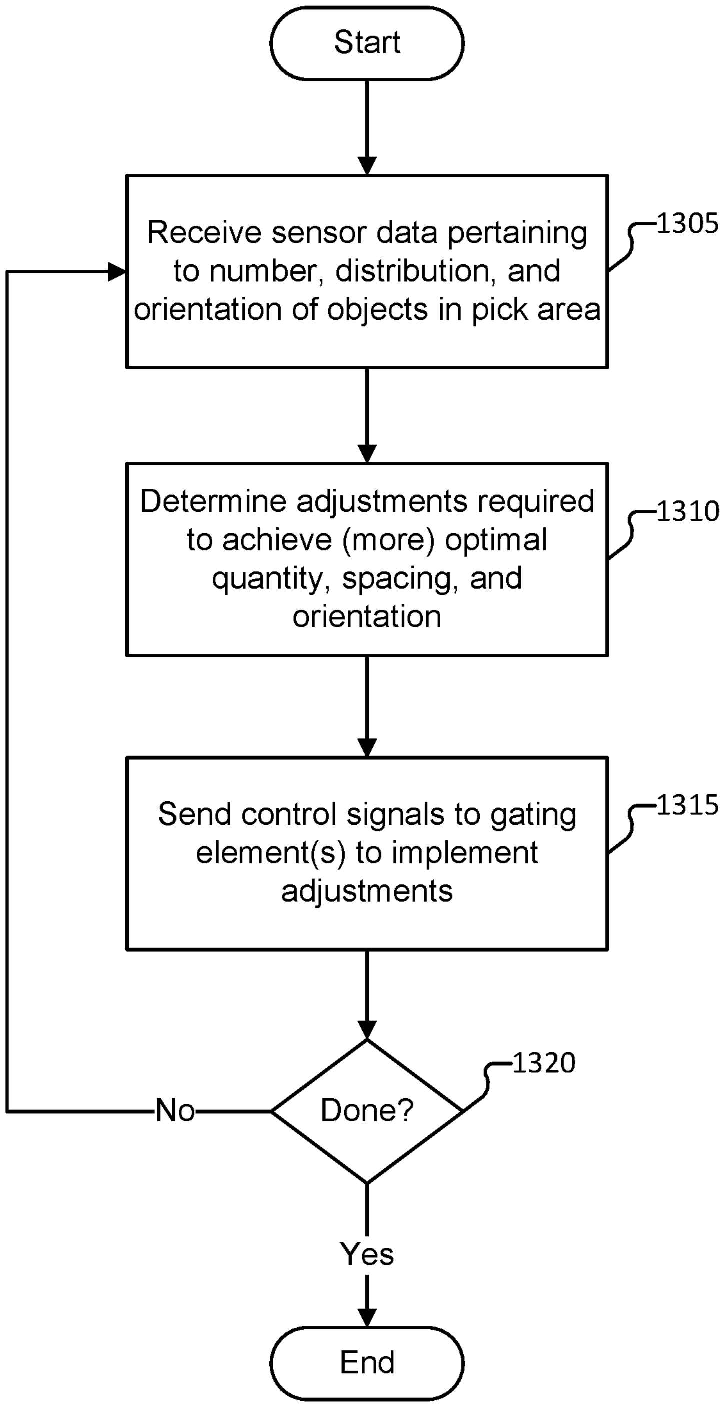
FIG. 13 is a flow diagram of a method for mediating a flow of items from an input source to a pick area according to various embodiments.

FIG. 13 is a flow diagram of a method for mediating a flow of items from an input source to a pick area according to various embodiments. At 1305, sensor data pertaining to a number, distribution, and orientation of objects in the pick area is received. At 1310, the system determines adjustments required to achieve (more) optimal quantity, spacing, and orientation. At 1315, the system sends control signals to gating elements to implement adjustments. For example, the system sends the control signals to the gating structure, which in turn controls one or more gating elements, such as to mediate flow of items to the pick area, control the distribution of the pick area, or to ensure that characteristics of the pick area satisfy one or more criteria (e.g., density threshold(s), volume threshold(s), etc.). At 1320, a determination is made as to whether process 1300 is complete. In some embodiments, process 1300 is determined to be complete in response to a determination that no further gating elements are to be controlled, no further items exist for delivery to the pick area, no further robots are to be controlled to move items from the pick area, an administrator indicates that process 1300 is to be paused or stopped, etc. In response to a determination that process 1300 is complete, process 1300 ends. In response to a determination that process 1300 is not complete, process 1300 returns to 1305.

Figure 14:
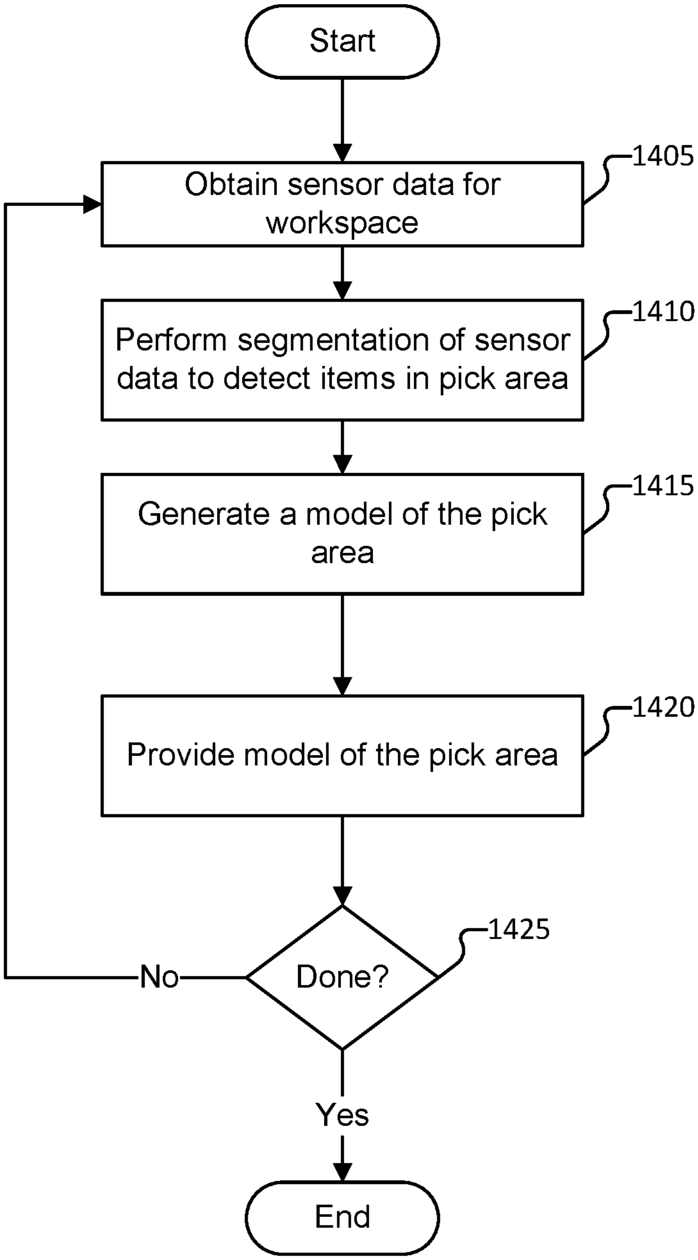
FIG. 14 is a flow diagram of a method for obtaining a model of the pick area according to various embodiments.

FIG. 14 is a flow diagram of a method for obtaining a model of the pick area according to various embodiments. At 1405, sensor data for a workspace is obtained. At 1410, the system performs segmentation of sensor data to detect items in the pick area. At 1515, a model of the pick area is generated. At 1420, the model of the pick area is provided. At 1425, a determination is made as to whether process 1400 is complete. In some embodiments, process 1400 is determined to be complete in response to a determination that no further gating elements are to be controlled, no further items exist for delivery to the pick area, no further robots are to be controlled to move items from the pick area, no further workspaces of robots, or parts of the pick area associated with one or more robots in the workspace, are to be modeled, an administrator indicates that process 1400 is to be paused or stopped, etc. In response to a determination that process 1400 is complete, process 1400 ends. In response to a determination that process 1400 is not complete, process 1400 returns to 1405.

Figure 15:
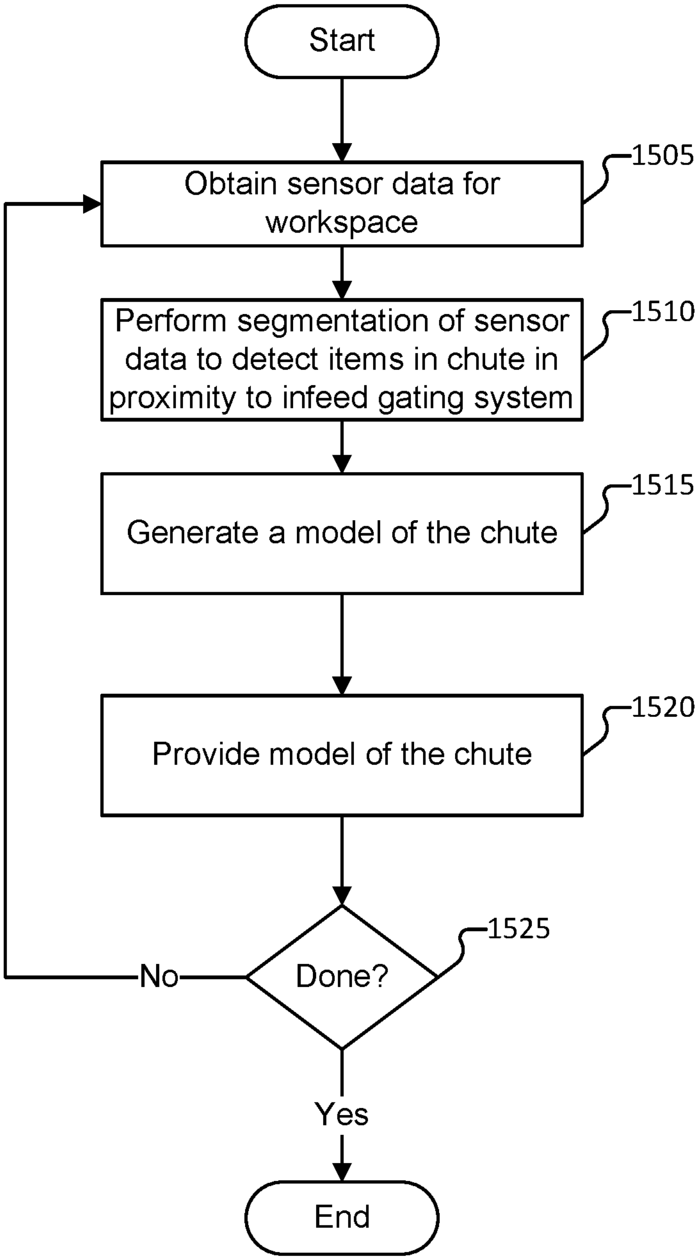
FIG. 15 is a flow diagram of a method for generate a model of the workspace according to various embodiments.

FIG. 15 is a flow diagram of a method for generate a model of the workspace according to various embodiments. At 1505, sensor data for a workspace is obtained. At 1510, the system performs segmentation of sensor data to detect items in a chute in proximity to the infeed gating system. At 1515, a model of the chute is generated. At 1520, the model of the chute is provided. At 1525, a determination is made as to whether process 1500 is complete. In some embodiments, process 1500 is determined to be complete in response to a determination that no further gating elements are to be controlled, no further items exist for delivery to the pick area, an administrator indicates that process 1500 is to be paused or stopped, etc. In response to a determination that process 1500 is complete, process 1500 ends. In response to a determination that process 1500 is not complete, process 1500 returns to 1505.

Figure 16:
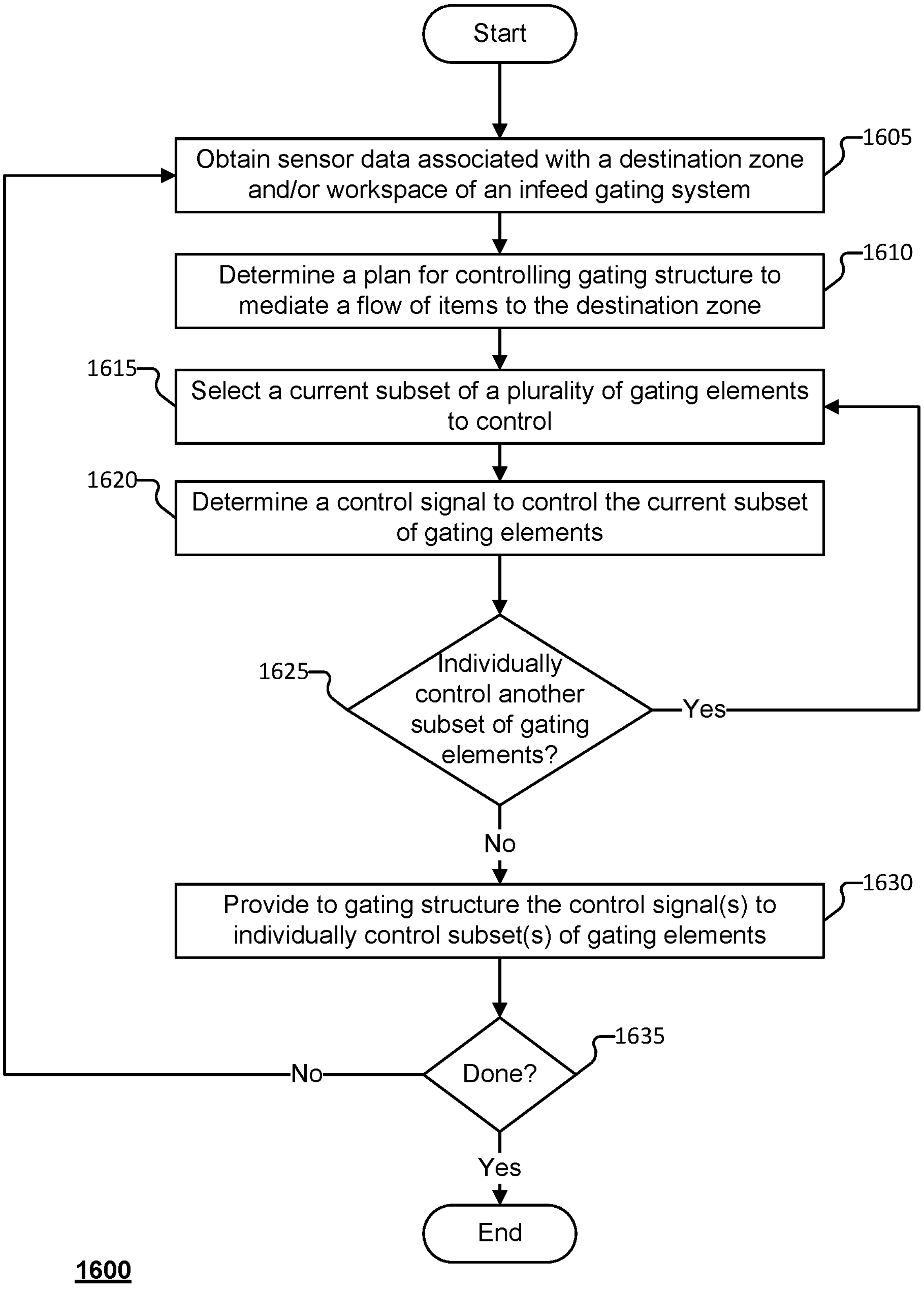
FIG. 16 is a flow diagram of a method for controlling a subset of gating elements of a gating structure according to various embodiments.

FIG. 16 is a flow diagram of a method for controlling a subset of gating elements of a gating structure according to various embodiments.

At 1605, the system obtains sensor data associated with a pick area and/or workspace of an infeed gating system.

At 1610, the system determines a plan for controlling gating structure to mediate a flow of items to the pick area.

At 1615, the system selects a current subset of a plurality of gating elements to control. For example, the system determines a subset of the plurality of gating elements in the gating structure to be controlled to mediate a flow of items from an input source to the pick area (e.g., via the gating structure).

At 1620, the system determines a control signal to control the current subset of gating elements.

At 1625, the system determines whether another subset of gating elements is to be individually controlled. For example, the system determines whether another subset of gating elements of the gating structure is to be individually controlled, such as to mediate flow in another flow channel in the system or to mediate flow to another robot in the workspace.

In response to determining that another subset of gating elements is to be individually controlled at 1625, process 1600 returns to 1615 and process 1600 iterates over 1615 to 1625 until the system determines no further subsets of the plurality of gating elements are to be controlled.

In response to determining that no further subsets of gating elements are to be individually controlled at 1625, process 1600 proceeds to 1630 at which the system provides to the gating structure the control signal(s) to individually control the subset(s) of gating elements.

At 1635, a determination is made as to whether process 1600 is complete. In some embodiments, process 600 is determined to be complete in response to a determination that no further gating elements are to be controlled, no further items exist for delivery to the pick area, no further robots are to be controlled to move items from the pick area, an administrator indicates that process 1600 is to be paused or stopped, etc. In response to a determination that process 1600 is complete, process 1600 ends. In response to a determination that process 1600 is not complete, process 1600 returns to 1605.

Figure 17:
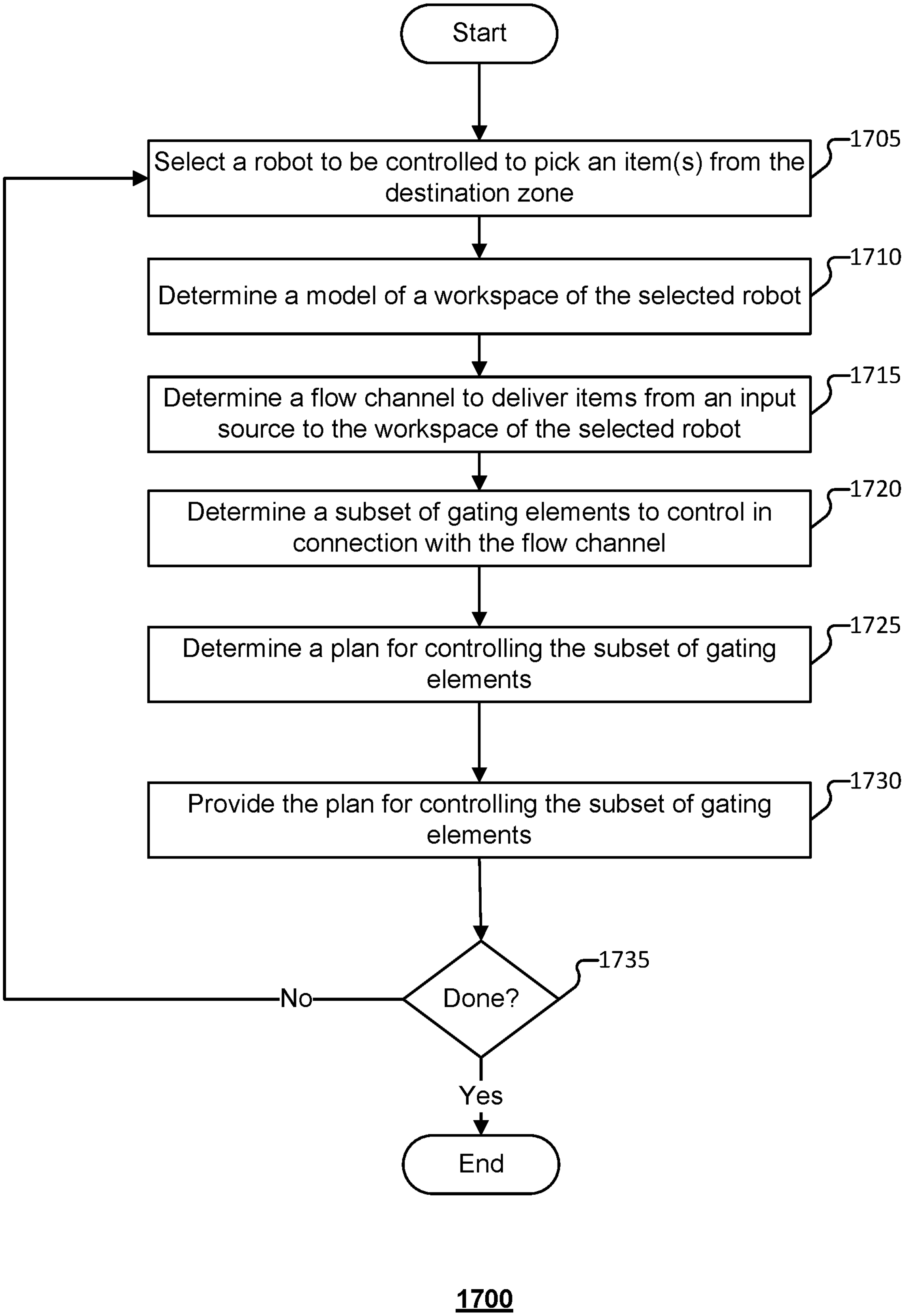
FIG. 17 is a flow diagram of a method for obtaining a plan for controlling a subset of gating elements of a gating structure according to various embodiments.

FIG. 17 is a flow diagram of a method for obtaining a plan for controlling a subset of gating elements of a gating structure according to various embodiments. At 1705, the system selects a robot to be controlled to pick an item(s) from the pick area. At 1710, a model of the workspace of the selected robot is determined. At 1715, a flow channel to deliver items from an input source to the workspace of the selected robot is determined. At 1720, the system determines a subset of gating elements to be controlled in connection with the flow channel. At 1725, the system determines a plan for controlling the subset of gating elements. At 1730, the plan for controlling the subset of gating elements is provided. At 1735, a determination is made as to whether process 1700 is complete. In some embodiments, process 1700 is determined to be complete in response to a determination that no further gating elements are to be controlled, no further items exist for delivery to the pick area, no further robots are to be controlled to move items from the pick area, an administrator indicates that process 1700 is to be paused or stopped, etc. In response to a determination that process 1700 is complete, process 1700 ends. In response to a determination that process 1700 is not complete, process 1700 returns to 1705.

Figure 18:
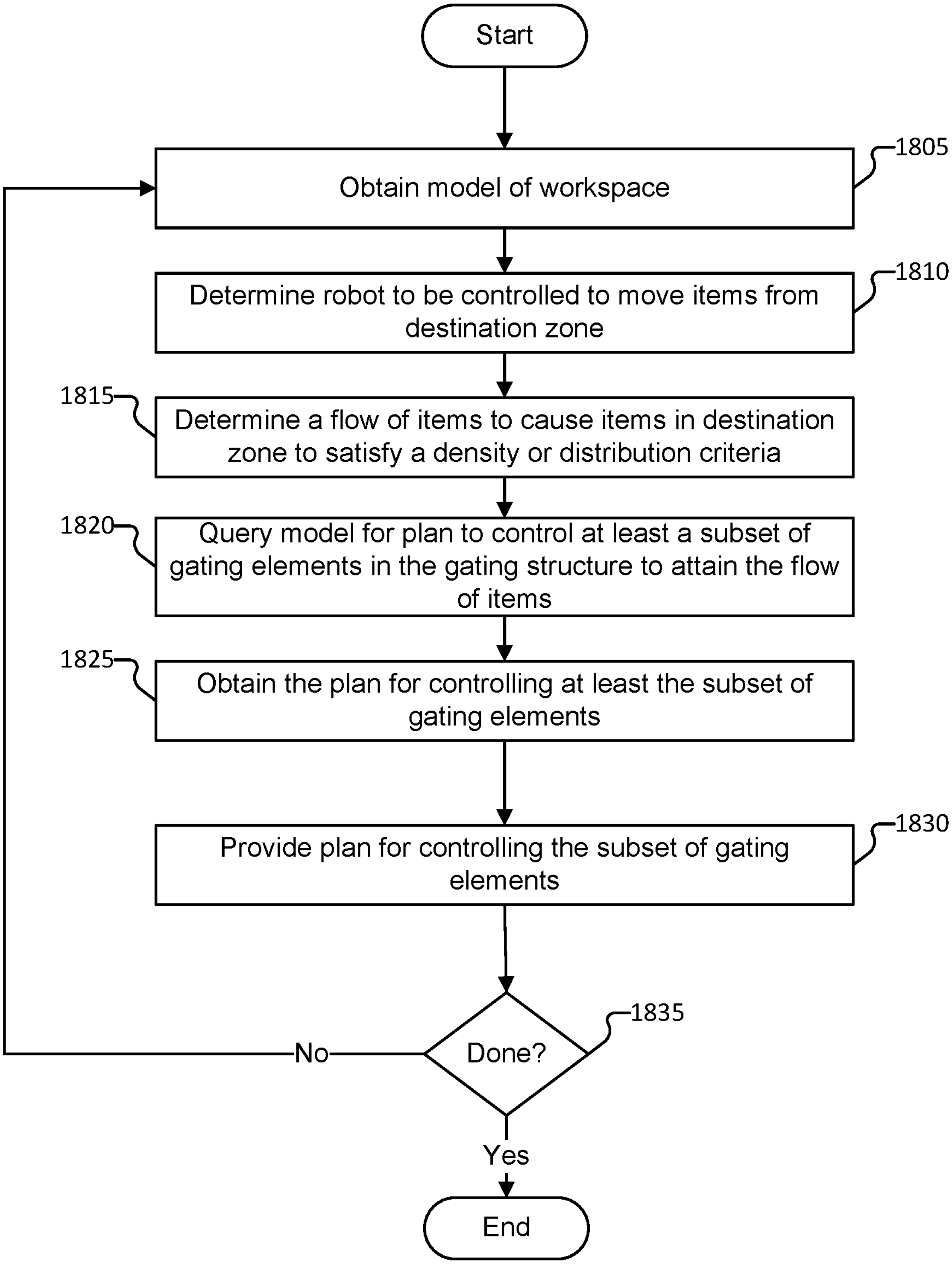
FIG. 18 is a flow diagram of a method for obtaining a plan for controlling a subset of gating elements of a gating structure according to various embodiments.

FIG. 18 is a flow diagram of a method for obtaining a plan for controlling a subset of gating elements of a gating structure according to various embodiments. At 1805, a model of a workspace is obtained. At 1810, a robot to be controlled to move items from a pick area is determined. At 1815, the system determines a flow of items to cause items in a pick area to satisfy a density or distribution criteria. At 1820, a model is queried for a plan to control at least a subset of gating elements in a gating structure to attain the flow of items. At 1825, the plan for controlling at least the subset of gating elements is obtained. At 1830, a plan for controlling the subset of gating elements is provided. At 1835, a determination is made as to whether process 1800 is complete. In some embodiments, process 1800 is determined to be complete in response to a determination that no further gating elements are to be controlled, no further items exist for delivery to the pick area, no further robots are to be controlled to move items from the pick area, an administrator indicates that process 1800 is to be paused or stopped, etc. In response to a determination that process 1800 is complete, process 1800 ends. In response to a determination that process 1800 is not complete, process 1800 returns to 1805.

Although the foregoing examples are described in the context of singulating a set of items, various embodiments may be implemented in connection with palletizing/de-palletizing a set of items and/or kitting a set of items. For example, various embodiments are implemented to control a gating structure to mediate a flow of items to a pick area in the workspace of a robotic arm that is controlled to pick items from the pick area, such as in connection with performing a pick and place operation.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An infeed gating system, comprising:

a gating structure configured to use a plurality of gating elements to mediate a flow of items from an input source to a pick area, wherein at least a subset of the plurality of gating elements are individually controlled;

a sensor configured to provide a sensor output associated with the pick area, wherein the sensor output comprises one or more of a flow rate, a number, and an orientation of objects in an area associated with picking of objects by one or more robots; and a processor configured to:

provide a control input to the gating structure to adjust a configuration of one or more of the plurality of gating elements based at least in part on one or more of the flow rate, the number, and the orientation of objects in the area associated with picking of objects by one or more robots; and determine a timing of raising/lowering a gating element to infeed a predetermined number of items to the pick area in a manner without negatively impacting a rate at which a robot picks items from the pick area.

2. The infeed gating system of claim 1, wherein the plurality of gating elements comprises a plurality of bollards.

3. The infeed gating system of claim 1, wherein a first subset of the plurality of gating elements is controlled to permit or restrict a first channel of flow, and a second subset of the plurality of gating elements is controlled to permit or restrict a second channel of flow.

4. The infeed gating system of claim 3, wherein the first subset of the plurality of gating elements is controlled to permit a first channel of flow, and the second subset of the plurality of gating elements is individually controlled to restrict the channel of flow.

5. The infeed gating system of claim 1, wherein the processor optimizes control of a plurality of subsets of gating elements in connection with optimizing a picking of items from the pick area.

6. The infeed gating system of claim 1, wherein the processor controls a plurality of subsets of gating elements to cause a density or distribution of items in the pick area to satisfy one or more density or distribution criteria.

7. The infeed gating system of claim 1, wherein adjusting a configuration of one or more of the plurality of gating elements includes actuating a first gating element to be oriented in a retracted state, a fully extended state, or a partially extended state.

8. The infeed gating system of claim 1, wherein at least one of the plurality of gating elements comprises a pneumatically actuated piston.

9. The infeed gating system of claim 1, wherein the pick area corresponds to a pick area from which a robotic arm picks items in connection with performing a pick and place operation.

10. The infeed gating system of claim 1, wherein the processor generates a model of a state of pick area based at least in part on the sensor output.

11. The infeed gating system of claim 10, wherein the processor controls at least one of the plurality of gating elements based at least in part on the model of the state of the pick area.

12. The infeed gating system of claim 10, wherein the model of the state of pick area includes information pertaining to shapes of items in the pick area, sizes of items in the pick area, orientations of items in pick area, a density of items in pick area, a volume of items in pick area, a type(s) of items in the pick area.

13. The infeed gating system of claim 10, wherein the processor is further configured to obtain a model of a flow of items from the input source to the pick area, and control configuration of at least a first gating element of the plurality of gating elements based on one or more characteristics of the flow of items.

14. The infeed gating system of claim 13, wherein at least the first gating element is actuated to change the flow of items from the infeed gating system to the pick area.

15. The infeed gating system of claim 1, wherein at least two robots are positioned in, or within proximity of, the pick area on opposing sides.

16. The infeed gating system of claim 15, wherein the at least two robots includes (i) a first robot positioned on a first side of the pick area and controlled to pick items from the first side of the pick area, and (ii) a second robot positioned on a second side of the pick area and controlled to pick items from the second side of the pick area.

17. The infeed gating system of claim 16, wherein:
- the plurality of gating elements comprises:
  - a first subset of gating elements associated with a first side of the pick area; and
  - a second subset of gating elements associated with a second side of the pick area; and
- the processor controls the first subset of gating elements based at least in part on operation of the first robot, and separately controls the second subset of gating elements based at least in part on the operation of the second robot.

18. The infeed gating system of claim 17, wherein the first subset of gating elements is controlled based at least in part on one or more characteristics of an area of the pick area in proximity to first robot.

19. The infeed gating system of claim 16, wherein the processor is further configured to actuate the gating structure to individually control the flow of items to respective workspaces of the first robot and second robot in a manner that causes the flow of items to satisfy one or more predefined flow criteria.

20. The infeed gating system of claim 1, wherein the processor is further configured to store an association between control of the plurality of gating elements and resultant flow of items or state of the pick area.

21. The infeed gating system of claim 20, wherein the processor is configured to train a model to be used to determine control of the gating structure, the model being trained based at least in part on the association between control of the plurality of gating elements and resultant flow of items or state of the pick area.

22. The infeed gating system of claim 1, wherein the processor is further configured to: log the sensor output and control information for operation of the gating structure.

23. The infeed gating system of claim 1, wherein the processor is further configured to configure a user interface to include a representation of efficiency/effectiveness of robot picking operations with respect to items in the pick area.

24. A method, comprising:
- obtaining, by one or more sensors, a sensor output associated with a pick area of an infeed gating system, wherein:
  - the infeed gating system comprises a gating structure configured to use a plurality of gating elements to mediate a flow of items from an input source to the pick area; and
  - the sensor output comprises one or more of a flow rate, a number, and an orientation of objects in an area associated with picking of objects by one or more robots; and
- providing, by one or more processors, a control input to the gating structure to adjust a configuration of one or more of the plurality of gating elements based at least in part on one or more of the flow rate, the number, and the orientation of objects in the area associated with picking of objects by one or more robots, wherein at least a subset of the plurality of gating elements are individually controlled, and wherein a timing of raising/lowering a gating element is determined to infeed a predetermined number of items to the pick area in a manner without negatively impacting a rate at which a robot picks items from the pick area.

25. A computer program product to control an infeed gating system, the computer program product being embodied in a non-transitory computer readable medium and comprising computer instructions for:
- obtaining, by one or more sensors, a sensor output associated with a pick area of an infeed gating system, wherein:
  - the infeed gating system comprises a gating structure configured to use a plurality of gating elements to mediate a flow of items from an input source to the pick area; and the sensor output comprises one or more of a flow rate, a number, and an orientation of objects in an area associated with picking of objects by one or more robots; and providing, by one or more processors, a control input to the gating structure to adjust a configuration of one or more of the plurality of gating elements based at least in part on one or more of the flow rate, the number, and the orientation of objects in the area associated with picking of objects by one or more robots, wherein at least a subset of the plurality of gating elements are individually controlled, and wherein a timing of raising/lowering a gating element is determined to infeed a predetermined number of items to the pick area in a manner without negatively impacting a rate at which a robot picks items from the pick area.

26. An infeed gating system, comprising:

a gating structure configured to use a plurality of gating elements to mediate a flow of items from an input source to a pick area, wherein at least a subset of the plurality of gating elements are individually controlled, and wherein the plurality of gating elements comprises a plurality of bollards;

a sensor configured to provide a sensor output associated with the pick area, wherein the sensor output comprises one or more of a flow rate, a number, and an orientation of objects in an area associated with picking of objects by one or more robots; and a processor configured to provide a control input to the gating structure to adjust a configuration of one or more of the plurality of gating elements based at least in part on one or more of the flow rate, the number, and the orientation of objects in the area associated with picking of objects by one or more robots.

27. A method, comprising:

obtaining, by one or more sensors, a sensor output associated with a pick area of an infeed gating system, wherein:

the infeed gating system comprises a gating structure configured to use a plurality of gating elements to mediate a flow of items from an input source to the pick area, and wherein the plurality of gating elements comprises a plurality of bollards; and the sensor output comprises one or more of a flow rate, a number, and an orientation of objects in an area associated with picking of objects by one or more robots; and providing, by one or more processors, a control input to the gating structure to adjust a configuration of one or more of the plurality of gating elements based at least in part on one or more of the flow rate, the number, and the orientation of objects in the area associated with picking of objects by one or more robots, wherein at least a subset of the plurality of gating elements are individually controlled.

28. An infeed gating system, comprising:

a gating structure configured to use a plurality of gating elements to mediate a flow of items from an input source to a pick area, wherein at least a subset of the plurality of gating elements are individually controlled;

a sensor configured to provide a sensor output associated with the pick area, wherein the sensor output comprises one or more of a flow rate, a number, and an orientation of objects in an area associated with picking of objects by one or more robots; and a processor configured to provide a control input to the gating structure to adjust a configuration of one or more of the plurality of gating elements based at least in part on one or more of the flow rate, the number, and the orientation of objects in the area associated with picking of objects by one or more robots;

wherein:

at least two robots are positioned in, or within proximity of, the pick area on opposing sides;

the at least two robots includes (i) a first robot positioned on a first side of the pick area and controlled to pick items from the first side of the pick area, and (ii) a second robot positioned on a second side of the pick area and controlled to pick items from the second side of the pick area;

the plurality of gating elements comprises:

a first subset of gating elements associated with a first side of the pick area; and a second subset of gating elements associated with a second side of the pick area; and the processor controls the first subset of gating elements based at least in part on operation of the first robot, and separately controls the second subset of gating elements based at least in part on the operation of the second robot.

29. A method, comprising:

obtaining, by one or more sensors, a sensor output associated with a pick area of an infeed gating system, wherein:

the infeed gating system comprises a gating structure configured to use a plurality of gating elements to mediate a flow of items from an input source to the pick area; and the sensor output comprises one or more of a flow rate, a number, and an orientation of objects in an area associated with picking of objects by one or more robots; and providing, by one or more processors, a control input to the gating structure to adjust a configuration of one or more of the plurality of gating elements based at least in part on one or more of the flow rate, the number, and the orientation of objects in the area associated with picking of objects by one or more robots, wherein at least a subset of the plurality of gating elements are individually controlled;

wherein:

at least two robots are positioned in, or within proximity of, the pick area on opposing sides;

the at least two robots includes (i) a first robot positioned on a first side of the pick area and controlled to pick items from the first side of the pick area, and (ii) a second robot positioned on a second side of the pick area and controlled to pick items from the second side of the pick area;

the plurality of gating elements comprises:

a first subset of gating elements associated with a first side of the pick area; and a second subset of gating elements associated with a second side of the pick area; and a first subset of gating elements based at least in part on operation of the first robot, and the second subset of gating elements is separately controlled based at least in part on the operation of the second robot.

30. An infeed gating system, comprising:

a gating structure configured to use a plurality of gating elements to mediate a flow of items from an input source to a pick area, wherein at least a subset of the plurality of gating elements are individually controlled;

a sensor configured to provide a sensor output associated with the pick area, wherein the sensor output comprises one or more of a flow rate, a number, and an orientation of objects in an area associated with picking of objects by one or more robots; and a processor configured to provide a control input to the gating structure to adjust a configuration of one or more of the plurality of gating elements based at least in part on one or more of the flow rate, the number, and the orientation of objects in the area associated with picking of objects by one or more robots;

wherein:

at least two robots are positioned in, or within proximity of, the pick area on opposing sides;

the at least two robots includes (i) a first robot positioned on a first side of the pick area and controlled to pick items from the first side of the pick area, and (ii) a second robot positioned on a second side of the pick area and controlled to pick items from the second side of the pick area; and the gating structure is actuated to individually control the flow of items to respective workspaces of the first robot and second robot in a manner that causes the flow of items to satisfy one or more predefined flow criteria.

31. A method, comprising:

obtaining, by one or more sensors, a sensor output associated with a pick area of an infeed gating system, wherein:

the infeed gating system comprises a gating structure configured to use a plurality of gating elements to mediate a flow of items from an input source to the pick area; and the sensor output comprises one or more of a flow rate, a number, and an orientation of objects in an area associated with picking of objects by one or more robots; and providing, by one or more processors, a control input to the gating structure to adjust a configuration of one or more of the plurality of gating elements based at least in part on one or more of the flow rate, the number, and the orientation of objects in the area associated with picking of objects by one or more robots, wherein at least a subset of the plurality of gating elements are individually controlled;

wherein:

at least two robots are positioned in, or within proximity of, the pick area on opposing sides;

the at least two robots includes (i) a first robot positioned on a first side of the pick area and controlled to pick items from the first side of the pick area, and (ii) a second robot positioned on a second side of the pick area and controlled to pick items from the second side of the pick area; and the gating structure is actuated to individually control the flow of items to respective workspaces of the first robot and second robot in a manner that causes the flow of items to satisfy one or more predefined flow criteria.

* * * * *